(12) United States Patent
Jones

(10) Patent No.: US 8,559,914 B2
(45) Date of Patent: Oct. 15, 2013

(54) INTERACTIVE PERSONAL SURVEILLANCE AND SECURITY (IPSS) SYSTEM

(76) Inventor: M. Kelly Jones, Vancouver (CA)

( * ) Notice: Subject to any disclaimer, the term of this patent is extended or adjusted under 35 U.S.C. 154(b) by 1189 days.

(21) Appl. No.: 12/354,927

(22) Filed: Jan. 16, 2009

(65) Prior Publication Data

US 2009/0181640 A1 Jul. 16, 2009

Related U.S. Application Data

(60) Provisional application No. 61/021,447, filed on Jan. 16, 2008.

(51) Int. Cl.
*H04M 9/00* (2006.01)
(52) U.S. Cl.
USPC .............. 455/404.2; 455/404.1; 455/414.1; 455/456.3; 340/540; 340/573.1; 340/539.11; 340/988
(58) Field of Classification Search
USPC ............... 455/404.1, 404.2, 456.3; 340/540, 340/573.1, 539.11, 988
See application file for complete search history.

(56) References Cited

U.S. PATENT DOCUMENTS

| | | | |
|---|---|---|---|
| 6,522,265 B1 * | 2/2003 | Hillman et al. | 340/988 |
| 2002/0070856 A1 * | 6/2002 | Wolfe | 340/540 |
| 2002/0072348 A1 * | 6/2002 | Wheeler et al. | 455/404 |
| 2004/0155781 A1 * | 8/2004 | DeOme | 340/573.1 |
| 2005/0075116 A1 * | 4/2005 | Laird et al. | 455/456.3 |
| 2007/0293186 A1 * | 12/2007 | Lehmann | 455/404.2 |
| 2009/0191839 A1 * | 7/2009 | Cannon, Jr. | 455/404.1 |
| 2009/0215426 A1 * | 8/2009 | Dimsdale | 455/404.2 |
| 2011/0130112 A1 * | 6/2011 | Saigh et al. | 455/404.1 |

* cited by examiner

*Primary Examiner* — Amancio Gonzalez
(74) *Attorney, Agent, or Firm* — Thomas | Horstemeyer, LLP

(57) ABSTRACT

An interactive personal surveillance and security (IPSS) system for users carrying wireless communication devices. The system utilizes portable communication devices that are also capable of capturing and/or sending surveillance information. The system allows users carrying these devices to automatically capture surveillance information, have the information sent to one or more automated and remotely located surveillance (RLS) systems, and establish interactivity for the verification of determining secure or dangerous environments, encounters, logging events, or other encounters or observations. The RLS systems receive information from user communication devices and can follow user-definable parameters that establish the level or type of interactivity and determining when alarms or messages to third parties are needed. An IPSS system is user-definable and may become tailored and may respond to one or more users differently, based on each user's set-up and changes to the system. The interactive personal surveillance system may also react differently based on users' location, the users' potential safety or risk, when the users react differently to an event, others around them, etc.

20 Claims, 26 Drawing Sheets

User Modifying Surveillance Modes and Activations from WCD Screens

FIG 18

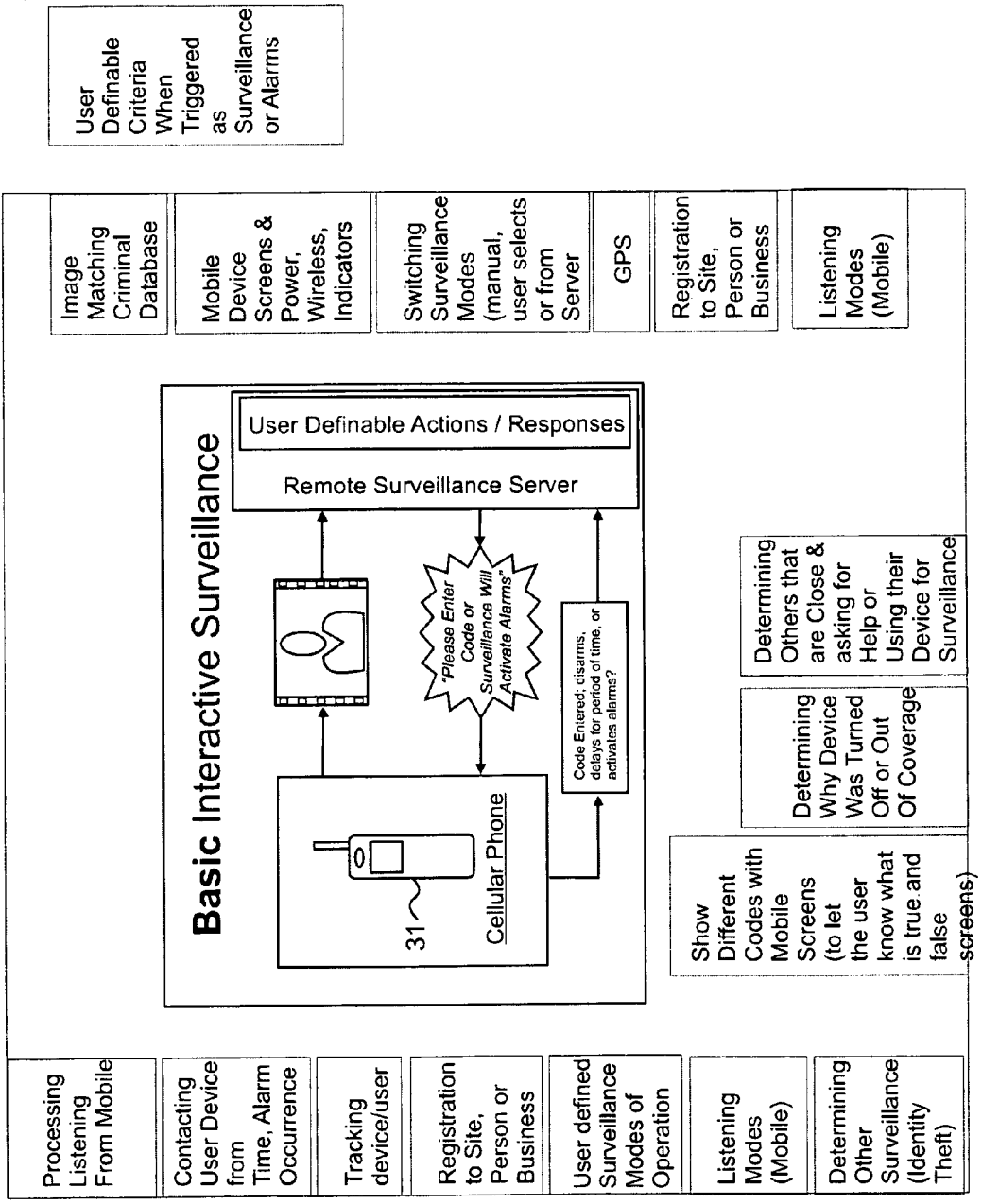

INTERACTIVE PERSONAL SURVEILLANCE AND SECURITY (IPSS) SYSTEM

CROSS-REFERENCE TO RELATED APPLICATION

This application claims priority to copending U.S. provisional application entitled, "Interactive Personal Surveillance System and Method," having Ser. No. 61/021,447, filed Jan. 16, 2008, which is entirely incorporated herein by reference.

FIELD OF THE INVENTION

The present invention relates to surveillance and security systems and, more particularly, to an interactive personal surveillance and security (IPSS) system utilizing common communication devices capable of monitoring the users, regardless of the users location, time-of-day, traveling, or in any area where standard surveillance is or is not present. The present invention enhances security and surveillance by determining a user's activities, including (a.) the user travel method (Car, bus, motorcycle, bike, snow skiing, skate boarding, etc.); (b.) the user motion (walking, running, climbing, falling, standing, lying down, etc.); and (c.) the user location and the time of day or time allowance of an activity, then automatically uses the user activities to set or engage alarms or surveillance (some interactive) including the activation of an alarm, engaging time-response security checks, capturing of video, still images and or audio and sends the information to a remotely located surveillance (RLS) system while automatically interacting with its user for the purpose of determining if other measures of security are needed or if the system should be turned off. The automated interactive personal surveillance system is capable of some, if not all, decisions to change modes of operation and capturing surveillance information to help safeguard and protect its users.

BACKGROUND OF THE INVENTION

There are many situations when individuals, carrying communication devices, would benefit from an IPSS system which utilizes most, if not all of the same hardware that they already have with them. A surveillance and security system within a common communication device, carried throughout the day, while entering higher risk areas, while active in travel or exercise, encountering individuals on the street or at their home as a stranger knocks on their door, or just as an increased margin of safety to have it everywhere and at any time without the limitation of fixed security and surveillance systems in cars, homes, parking lots, businesses, etc.

The inherent nature of stationary surveillance systems is to capture information for protecting buildings, homes, business operations and individuals while visiting a particular site. A personal surveillance system is for the protection of one or more users anywhere and all the time and not limited to areas but following the user throughout the day, from home to business, to shopping, to banking, walking through a park, traveling, snow skiing or any other place a person may reside, go to, travel in, walk, or be a part of.

Many individuals would benefit from an IPSS system that acted and reacted proactively based on their own individual and constantly changing requirements.

As in many of the past inventions, the ability to record and send this information to live monitors which people are watching, becomes inadequate and sometimes a resource overload if too many cameras are reporting. The true fact is that alarms or surveillance reporting on an individual level must be smart enough to activate automatically, before a crime or user needs assistance but not all the time, it must understand what its user is actively engaged in, how the user is engaged, where the user is engaged and respond and activate counter measures to suit the user's current (ever changing) needs.

The need for an IPSS system may be witnessed by observing individuals when walking to and from parking lots. Many individuals use their wireless communication device to call and talk to friends, relatives and other people when they enter unsafe or unknown environments. This common habit for people to talk to someone else when an individual is alone and feels uneasy, scared or potentially endangered, will be eased with the current interactive personal surveillance system invention.

The need for an IPSS system that utilizes existing technologies already carried by many users that captures and protects the surveillance information from being erased, stolen, or lost, interactivity that's tailored to each individuals requirements, alarms that may locate other individuals or businesses nearby or activate other alarms which may sound around or near the user in need, and the verification of people, places, and/or businesses would be a valuable and needed system.

SUMMARY OF THE INVENTION

The above and other needs are met by the present invention which, in one embodiment, provides an interactive personal security and surveillance (IPSS) system that's always with the user. The system comprises software (or firmware) installed on a user's portable communication device (Cell Phone, Wireless PDA, etc.) and capable of gathering GPS, accelerometer (or other motion device) readings, time, camera (or video), and audio (among others). A remotely located server (RLS) configured to communicate with and control alarm activations or surveillance information from each portable communication device. The system, both components are configured to interact and to send/receive surveillance and/or alarm information, and counter measures to each other.

Another aspect of the present invention is that it is capable of capturing/taking surveillance information, remotely storing and or processing the surveillance information away from the device (that could be destroyed, disposed-of or damaged) in a safe area.

It is desirable for people to tailor their own automated personal surveillance system to meet their own personal needs and requirements. Effective surveillance must match each user's needs by fitting into their own environments, daily lives, activities, everywhere and all the time. The user will select, at least in part, how the surveillance system will determine when actions are needed to help or assist the user. Through a user-definable online area within the system it may be programmed differently at one location over another, when traveling, depending on the time of day or day of week, when near known criminals or high crime areas, and when codes are entered or not entered when required. Listening modes allow another friend or person to receive live or recorded surveillance information for making a determination when authorities or help is needed, allowing others to remotely operate your surveillance mobile device, allowing others users (parents) to program a particular surveillance mode or complete operation (for children), possibly through specialized mobile device screens showing or not showing the operation of surveillance, contacting other near-by-users or closest authorities, activating other surveillance systems, making the mobile device operational but have it seem to be in an off position, activating alarm sounds and lights, and providing samples of surveillance information back to the mobile device and more options that allow this system to meet each users specific needs.

Criminal actions may include a plan to get around people, systems and authorities but the present invention makes it almost impossible to get around its security because every IPSS system acts and reacts differently, based on each user's preferences or at least codes. As example, one user's action may turn off the alarm; another person's IPSS may activate an alarm. A code that seemingly is turning off the system may actually turn on a silent or other alarm.

One feature of the invention, may include a user being approached by a stranger on an isolated street, the user activates the surveillance by pressing a button or audible voice commands and discretely (or obviously) aims the camera at the individual as he approaches. The information is sent to the remote server. Based on the user defined personal criteria, the system may notify others within 15 minutes if a deactivation code is not entered, or call/message the user back with or without another person knowing, or listen for the users "key phrases or loud voice" to immediately activate alarms.

Another example includes a user exiting a mall and walking to their car. The IPSS system may manually or automatically (via location, tracking, sensors or wireless acknowledgments at the mall door) go into an active mode such as "listening" for the users voice as in key phrases ("what do you want, help, stop, don't, police, get away, etc.) or higher volume (screaming, yelling, etc.). Once the system determines the user needs help, it may contact the local security, police, friends, or other individuals near to the user. The interactive system may have the users alarm sound, trigger other alarms nearby (car alarm(s), cellular phones, spot lights in areas, etc.), or turn on the speaker phone with 911 or other emergency agency person asking "is everything all right" or "police will be their immediately."

Another feature of this invention may include linking this IPSS to home and business alarm systems. As individuals check for noises or indications that an intruder may be inside their premises, the IPSS may engage the activation of home and business alarm systems. The IPSS may go into this mode automatically based on location (i.e. GPS, Logging into Wifi, sensors, etc.) or information determining a zone, once the user activates surveillance the system automatically starts sending audio, images and or video to the server. It also may use the IPSS mobile device to respond back to the user and ask the user if they are ok, the user must input the correct code, voice match, or other acknowledgement. This cycle continues until the user enters their code and selects cancel surveillance. If the user does not respond when the main server/database or within their own IPSS, the system will activate alarms and follow preset or user defined guidelines.

Another example includes a user catching a taxi in another country, the user before getting into the taxi activates their surveillance system and captures the license tag, drivers face and posted taxis license-of-operation. This information is sent to the remotely located server and the text and images are annualized (OCR—optical character recognition, automatic number plate recognition (ANPR), face recognition algorithms for matching normalized gradients or others facial differences/similarities, etc.) identifies/verifies the taxi company and the drivers information. The drivers face may be sent to a database for criminal matching. The users may have programmed the system to place the mobile device into listening mode for matching "key phrases", determining stress within the voice, high volume speech, or any audible indicator from the user. In this case, the user has set-up many key phrases and without the driver knowing the activation the phrase "I'm not telling you again, Stop" is matched. The system has automatically previously determined the taxi company name and phone number, and has contacted the authorities (police), taxis company, driver and the user all on a conference call. Or, in some cases, an automatic message is played explaining the surveillance and the activation which identified the individual driver and company. The message explains "unless the user enters a deactivation code within 3 minutes the closest law enforcement will be notified". Because the user's device or the taxi has GPS, the message also mentions the taxi's current address.

Another example is a user activates their surveillance system and the system is pre-programmed to contact other users that are close by, and to activate their surveillance systems if they see the individual within the photo/description. If another user identifies the user within the photo and or description, they will press a button that sends this information to the user's account (identifying one or more events of the same subject) that's requesting the information. It also should be noted, automatic payment or reward postings may also be included within the notification for actively engaging others to look for individuals.

Another feature of the present invention may include pre-programmed messages that are played to people or organizations when the surveillance is turned on, triggered, or security levels are increased/decreased. This feature may include a manual or automatic mode (security level) changes for sending different messages based on the time, location, or user activity. For example, "this is a surveillance message from John Smith. My location is the corner of Atlantic and Delk Road and I need help. Please come quickly and or contact the police. Also, if my wireless device is turned on, please wait and you will hear live conversations between me and anyone else within hearing range . . . "

Still another feature of the present invention may include the ability to use "other recording" devices or surveillance systems. As an example the system may provide the mobile device with an indicator (green light, map with location, etc.) showing where other surveillance systems are located. This information may be determined many ways, but an easy method is to have the RLS check the company or business name, registration of surveillance devices/systems, and other IPSS users.

Another feature of the present invention may include the Surveillance Information Protection (SIP) system that will not allow users to delete or change surveillance information. This feature may include a predefined time period (1 to 20 years) where the system or user cannot delete any surveillance information. This feature is used to keep criminals from demanding that the users delete surveillance recorded illegal activities. As an example, in a case where the user is forced to log-into the system and attempt to delete the recorded illegal activity information, the user may start the log-in procedure, enter their user log-in name and then while inputting their password enter all the numbers or letters correctly except one (or two, more or a special code). This will activate a false response to the user that the information was deleted, or the information may be deleted from a certain location (library, local business nearby, etc.), while actually contacting authorities and telling them where a criminal will be taking the user. The system will follow the predefined instructions set forth by the user and/or system.

Another feature of the present invention may include the User Activation of an alarm may be accomplished when a button is held down and then released. For example, the IPSS takes an image or video and sends this information to the RLS when the user pressing the hot-key on their device, if the user releases this key and does not enter a cancel or repeat delay (5, 15, 30, or 50 minutes), then an alarm is activated.

Another feature of the present invention may include its ability to disguise or hide alarms surveillance when activated. Another feather is the ability to interact with the user device that may assist the user—negotiating or dealing with criminal activity. This feature may indicate false screens on the mobile device. For example, false screens may show high level of wireless coverage (bars or meter for signal strength show good when actually no wireless is available), information being already sent (maybe even a review of part of the information "supposedly" sent), or a response that stays within the phone but seems to be coming from the RLS or Authorities (i.e. "your surveillance information was received and Authorities have been notified to your location—help is on the way"). It should be noted that only the user will know the difference between a fake or false screen and may have already programmed the messages that come onto the users screen (within the phone or server).

Another feature of the present invention may include software or firmware that after the activation, if the Wireless Communication Device (WCD) is turned off for a period of time or until the surveillance system is deactivated, the system will automatically turn the WCD back on. This is normally located within the WCD but it is also accomplished by the RLS communicating with the WCD in silent, sleep and wake-up, or time based health type checks verifying the WCD has not been destroyed or battery removed.

Another feature of this invention may trigger another call or text message to the closest cell phones (location based) and inform them of the surveillance activation. For example, if a user activates the IPSS in a taxi, the contact information of the driver of the taxi would be determined. The driver would be called and be told of the surveillance, that his name is identified, that authorities are/will be notified, and the importance to follow the instructions of the user (riding in the taxi). This may also trigger another call to the taxi management and offer them the opportunity to review the surveillance recordings (normally after the individual is known to be safe or when authorities or system management feel this action is appropriate).

Still another feature of the present invention may include the location based IPSS which allows activation of other user devices that are close to the individual who has activated the surveillance. For example, other devices capable of sending audio, images or video may be remotely turned on (or request the user for allowance). End users may have an automatic setting that allows it to be remotely turned on or to be prompted, or the user may refuse any surveillance information from their device.

Another feature of the present invention may include the Response Check-In (RCI). The mobile unit allows the user to activate and enter a time for the system to check back with them for verifying safety (user must enter code or have a voice match/key word).

Another feature of the present invention may include the Automated Programming Listening Mode. The listening mode is capable of capturing sounds and/or wireless communication from others systems and devices and allows the user to name, identify or associate these sounds or communication with a mode or action that helps the system determine the users environment. For example, the users IPSS system may record turning off their car engine, opening and closing the car door, and/or setting the car alarm. The capturing of the car alarm may be a sound (such as the car horn, alarm chirp or other) or the capture of the wireless key security information sent wirelessly to the car's alarm system and IPSS system. Then the system may automatically change the surveillance mode [to walking] and based on time of day or the use of location technologies, determine the condition [safety] of this area to walk thru, and adjust the surveillance mode accordingly.

Another feature of the present invention may include sending surveillance information to two or more public servers (areas) that is accessible and/or searchable by internet search engines. When user submit uploaded (or directly sent) surveillance information to the public server, the surveillance videos, images and/or audio includes at least one or more of these searchable areas, location, address, date and time, event name or category, and/or name describing video. When someone, for example, finds his car broken into, he will go to this website and enter the location, date and time to see if anyone has photos, videos, or other information about the event. If someone has surveillance information, then the information will be available from most common internet (or other) search engines.

It should also be noted that IPSS systems may incorporate basic functionality, such as sending an email or electronic message with images or video, the message recipient software automatically processing the text within the title, sender address or other areas and automatically taking additional actions. These actions may notify others with the surveillance recording and ask them to take additional measures. Or the system may respond back to the user with automated procedures and unless "deactivated" with a code, word or phrase the system takes additional measures to help the user.

BRIEF DESCRIPTION OF THE DRAWINGS

Figure 1:
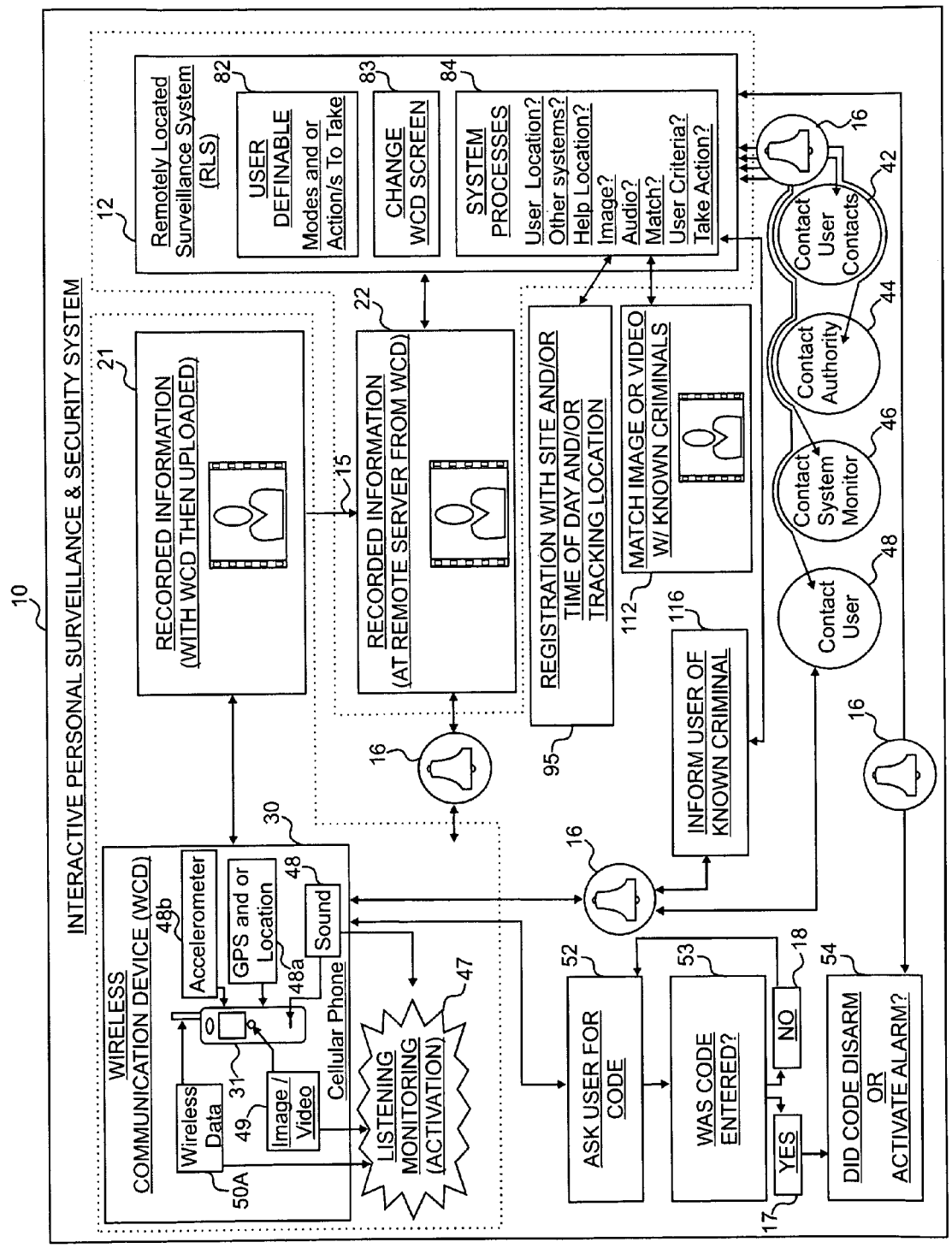

Having thus described the invention in general terms, reference will now be made to the accompanying drawings, which are not necessarily drawn to scale, and wherein:

The present invention can be better understood with reference to the following drawings. The drawings are not necessarily to scale, emphasis instead being placed upon clearly illustrating the principles of the present invention. Moreover, like reference numerals designate corresponding parts throughout the several views.

Figure 1A:
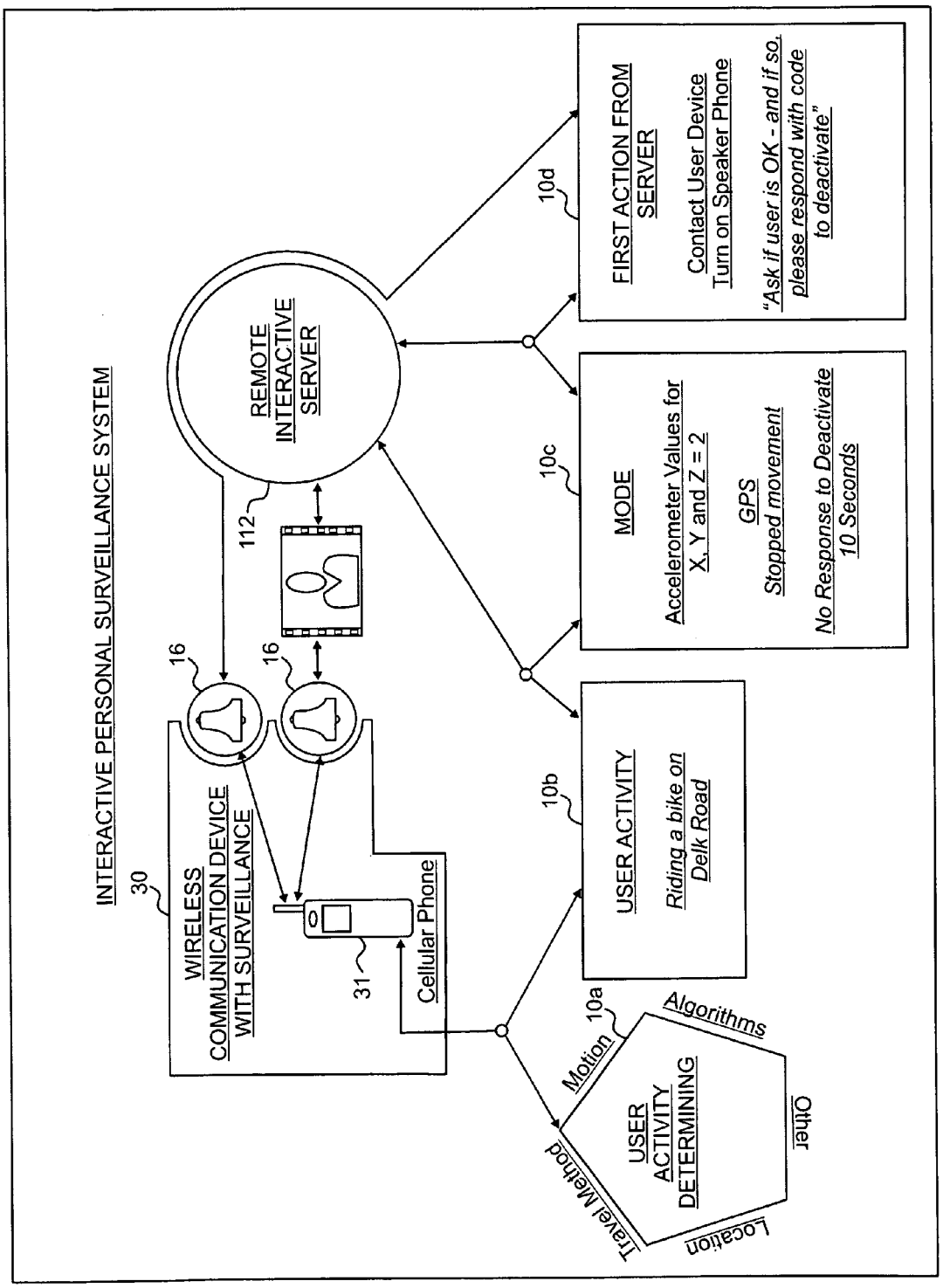

FIG. 1A is a high level schematic diagram of an Interactive Personal Surveillance and Security (IPSS) system of the present invention as applied to a user communication device enabled with GPS, accelerometer, and other devices and methods for determining the user's activity. This stage is utilized to help automatically modify the user modes and to activate appropriate security alarms and or surveillance measures.

FIG. 1 is a high level schematic diagram of an IPSS system of the present invention as applied to a user communication device enabled with GPS, accelerometer, image, video and sound capabilities. As an example, FIG. 1 depicts a wireless communication device such a cellular phone 31, in communication with a Remotely Located Surveillance (RLS) system 12, which in turn receives surveillance information and determines if any action is needed based on user requirements, then waits or communicates with the user communication device and/or others. Additionally, the Wireless Communication Device (WCD) has a listen mode 47 that monitors sound 48, video and or still images 49, or wireless data/signals 50A for automatically activating alarms or changing to different modes of surveillance for the user. Some images taken in certain surveillance modes are sent to a criminal matching database for identifying any known criminal. Other surveillance modes may send images to an OCR (optical character recognition) database for processing information (licenses, registrations, etc.) for the safety of the IPSS user.

Figure 2:
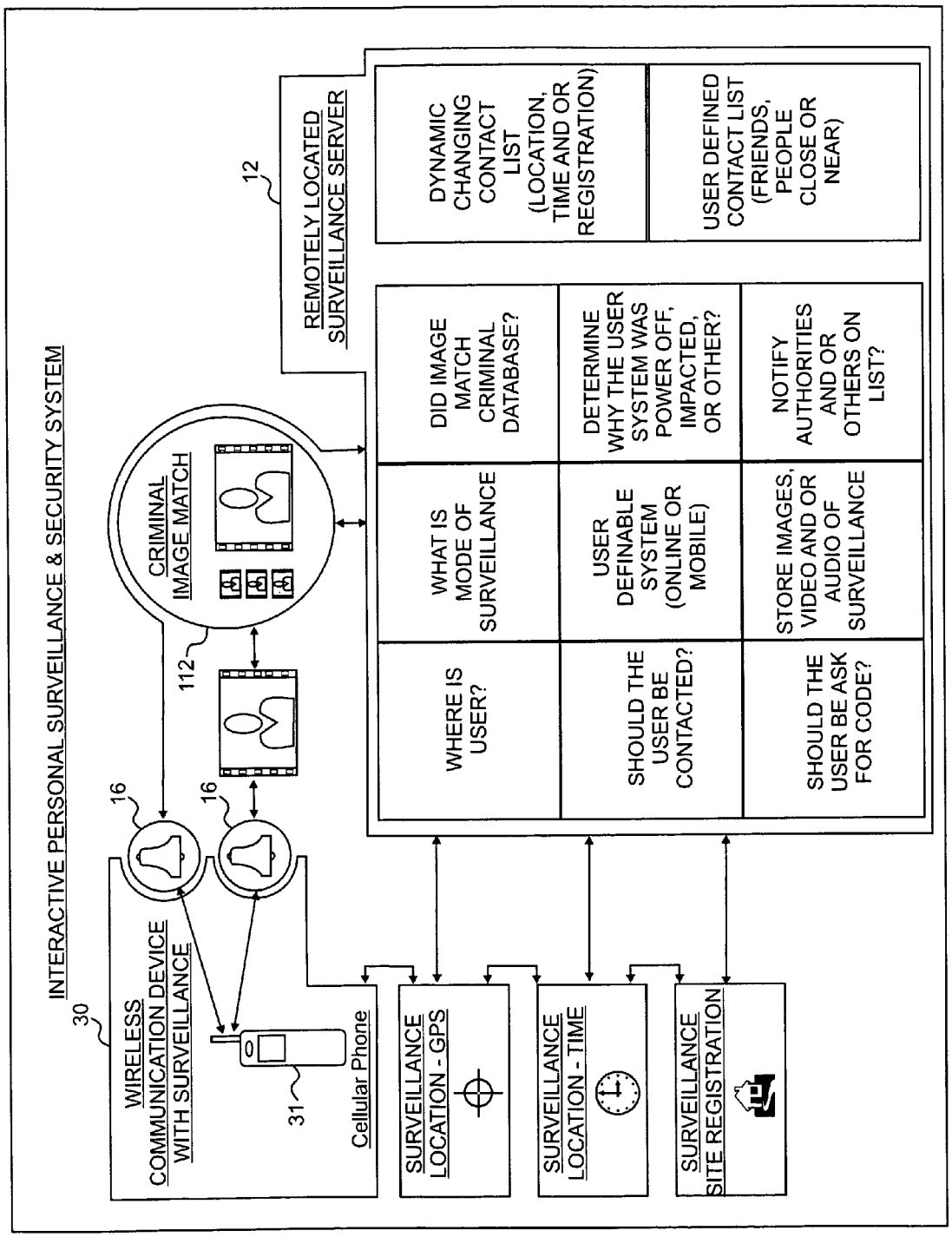

FIG. 2 is a high level schematic diagram of an IPSS system of the present invention as applied to a user communication device enabled with image or video capabilities, as an example. FIG. 2 depicts a user communication device capturing surveillance information within the mobile device or sending this information to be recorded within the RLS system, and the ability to utilize one or more technologies to annualize surveillance information and determine if or when the user may need additional assistance. As an example, a database for criminal image matching 112 may be utilized to determine and inform the user when they are around or corresponding with a criminal awaiting capture.

FIG. 2 also shows how the WCD utilizes different methods and technologies to determine its location and how to best control its surveillance and alarms at these different locations.

Figure 3:
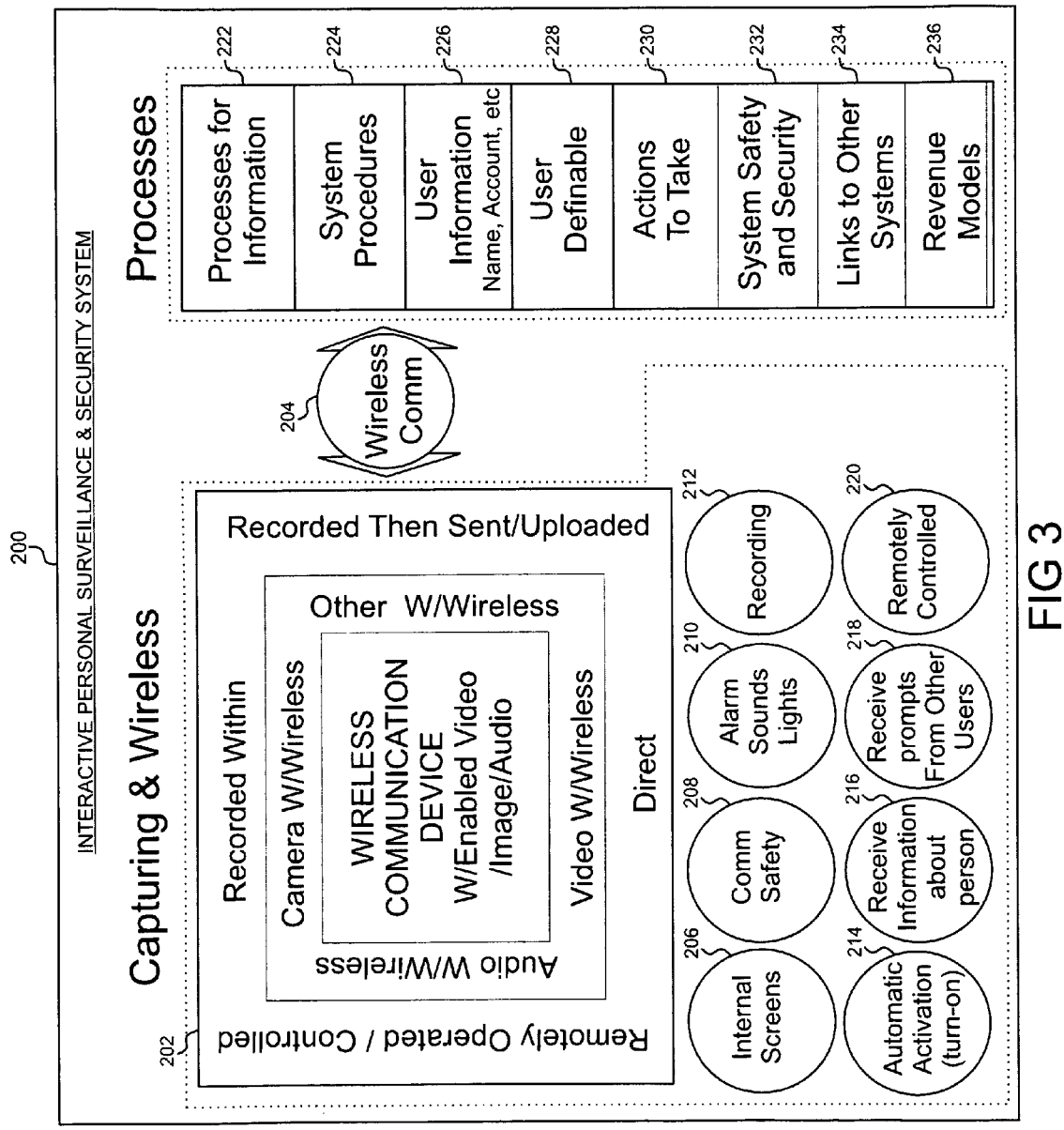

FIG. 3 is a high level flow chart diagram of an IPSS system of the present invention as applied to a user communication device enabled with image or video capabilities. As indicated in this diagram it may send information or process the information internally. Actions for the WCD include controlling internal screens 206, determining communication safety or availability 208, controlling alarm sounds and lights 210, recording 212, automatic activation 214, receiving information about a person 216 or prompts from other users 218, and being remotely controlled 220. It may connect to other wireless surveillance equipment or systems, and the high level view of some of the processes of the RLS for responding to user or user device information and response activations is shown.

Figure 4:
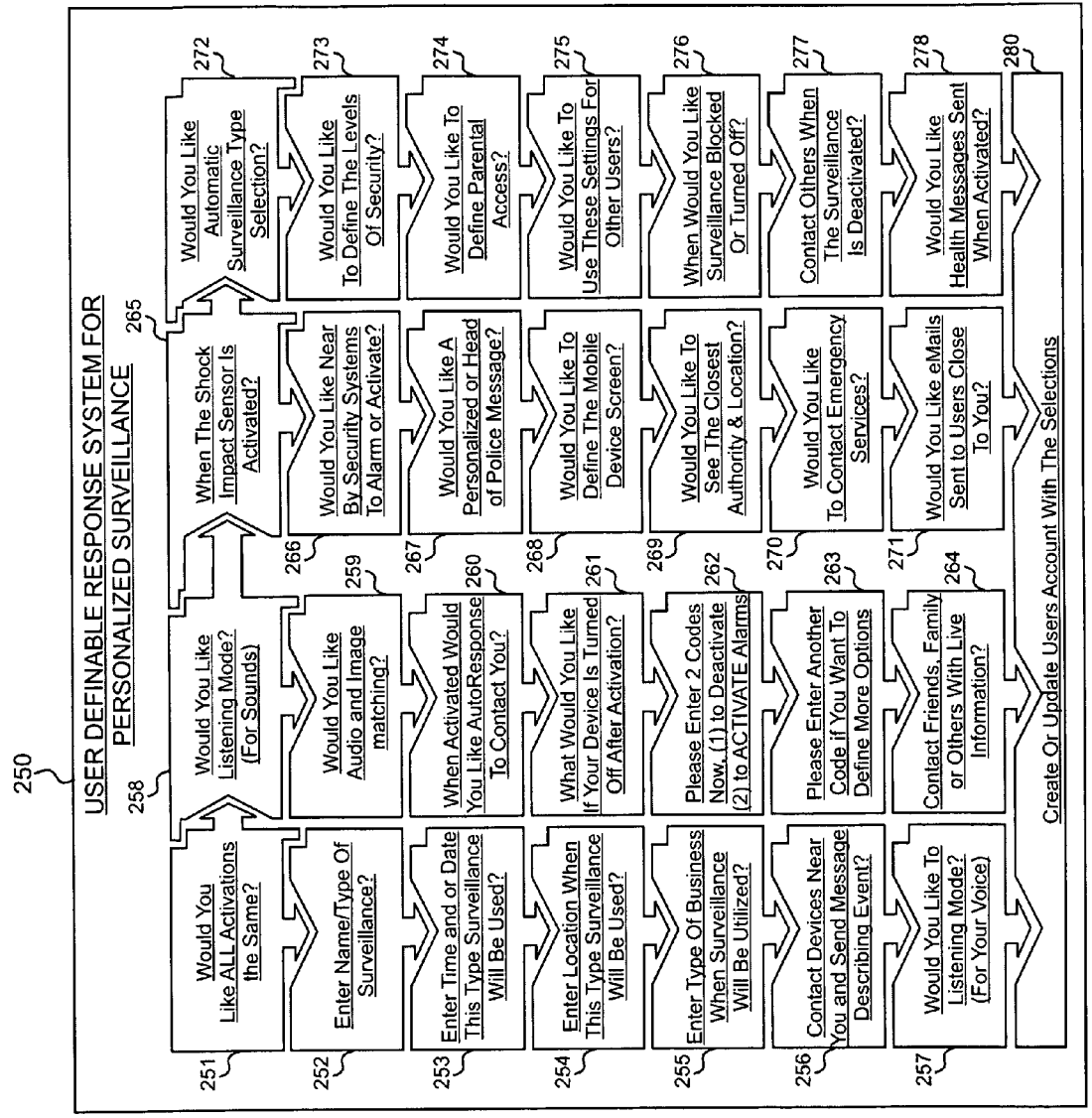

FIG. 4 is a high level flow chart diagram of an IPSS system of the present invention as applied to a user communication device enabled with image or video capabilities. As indicated in this diagram, the IPSS generally includes a user definable area that allows each user to define what activations or modes of operations will occur as information is triggered or sent to the RLS. As shown, one component allows the user to set all surveillance types the same or set each one differently. The surveillance types offer higher, lower or different security options based on the user's location or the users circumstance. For example, this offers a user that is walking home to increase the immediacy for activating alarms and contacting others.

The sound listening and voice matching feature of this invention allows users to have the mobile device pickup sounds and internally process them or have the RLS (or combination of both) process the sounds to determine when users need additional help or surveillance. The system to hear sounds, such as but not limited to, key phrases or words, increased volume from the user (screaming, talking aggressively, etc.), or any other sound that may active or deactivate the alarms or surveillance.

The image matching feature of this invention allows users to capture video or images and have these images matched with one or more databases for people identified as threats or potential criminal activity. When the match occurs, the user device may inform the user and/or activate additional surveillance or alarms.

Also shown in FIG. 4 is a feature for contacting devices or users near or close by the activation of an alarm. This feature allows the system to automatically notify people within the shortest distance from the user and that may help the user as soon as possible.

Still another feature of the present invention may include a shock sensor, impact sensor or extreme deceleration sensor, that once triggered, may automatically notify authorities, emergency services or others and activate speaker phone conferencing with one or more, the system may also be used if the device is attempted to be destroyed it may send out an emergency code to the RLS.

Figure 5:
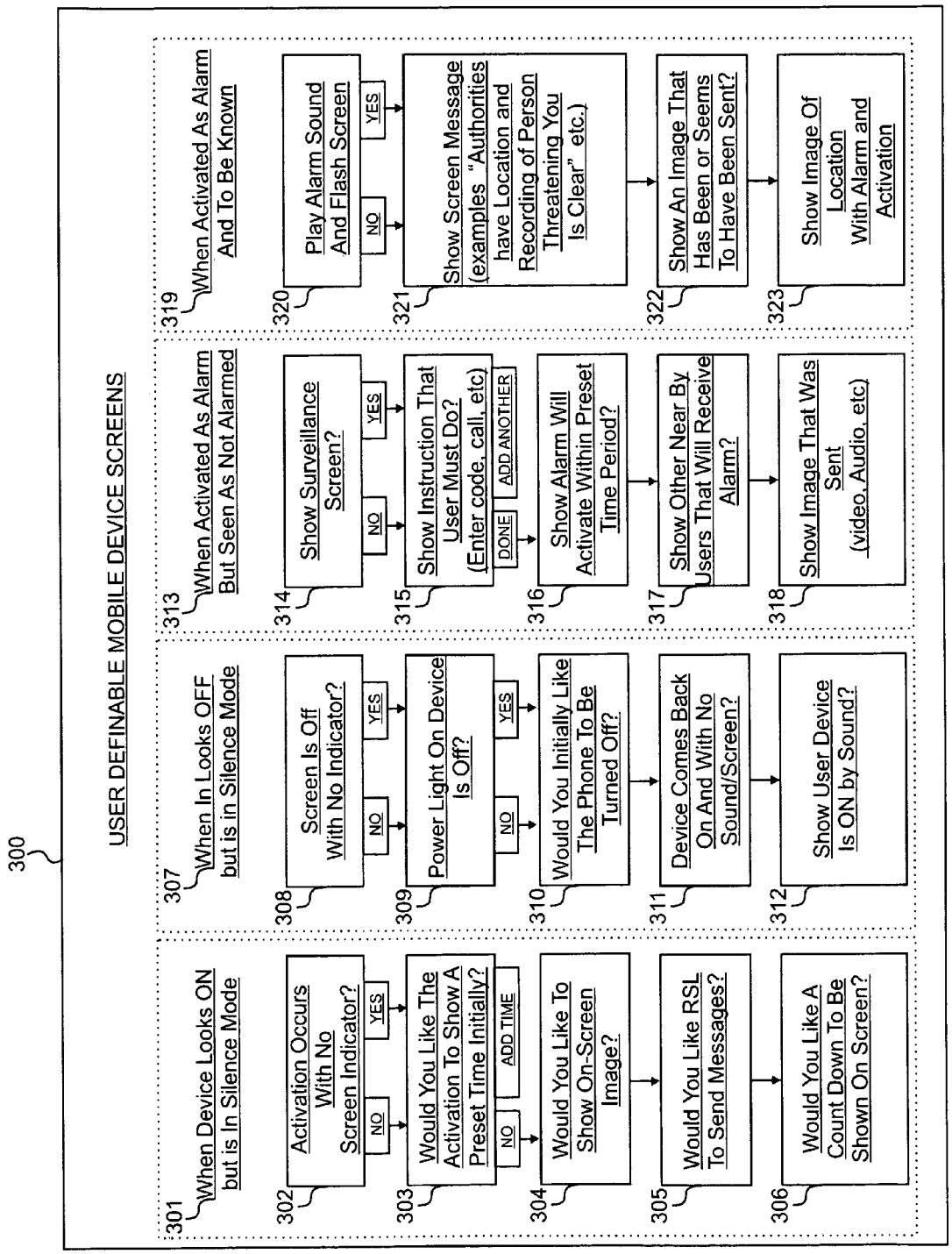

FIG. 5 is a high level flow chart diagram of an IPSS system of the present invention as applied to a user communication device enabled with image or video capabilities. As indicated in this diagram 300, the system allows the mobile/wireless device to hide its mode of operation by appearing off when on, not activated or activated, to show or not show $3^{rd}$ parties its mode of operation, and act as if it has done or accomplished things when it has or has not.

Another feature may be to active alarms and show images/audio that have been or appear to have been sent for surveillance.

Figure 6:
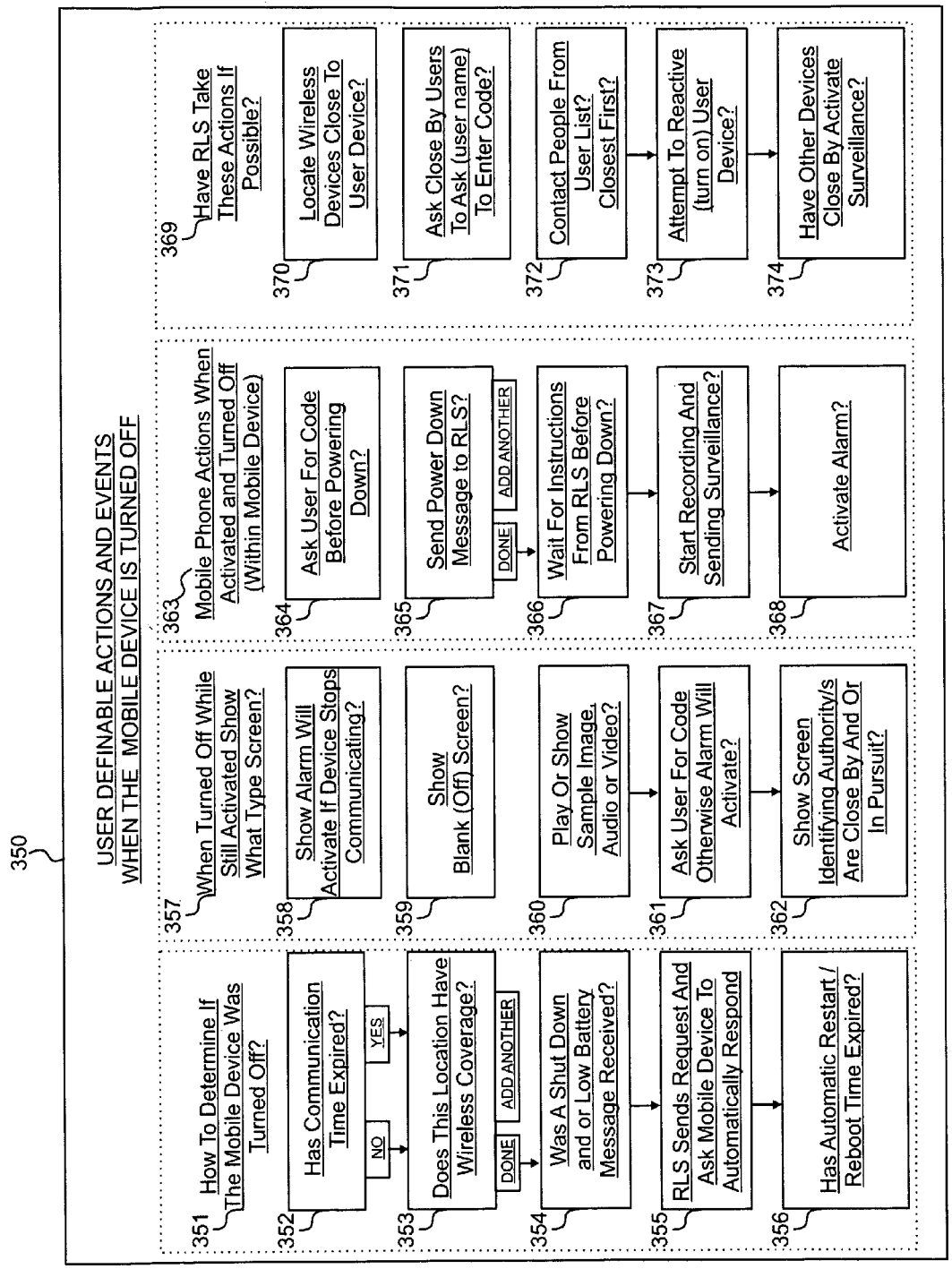

FIG. 6 is a high level flow chart diagram of an IPSS system of the present invention as applied to a user communication device enabled with image or video capabilities. As indicated in this diagram, the IPSS system generally attempts to determine when the unit is turned off 350 and whether this was a security alert or natural (no security needed) occurrence. The flow chart diagram shows the RLS attempting to contact the wireless device and after a preset time period, activating the next mode of security. The system attempts to determine if wireless coverage is available for the user device, the battery is low, and/or the device automatically restarted.

Another feature may be manipulating the screen to look off, but when surveillance was activated to not turn off but look off. Or another feature may be to ask the user to enter code or alarm will activate (or activate with a preset time frame).

Figure 7:
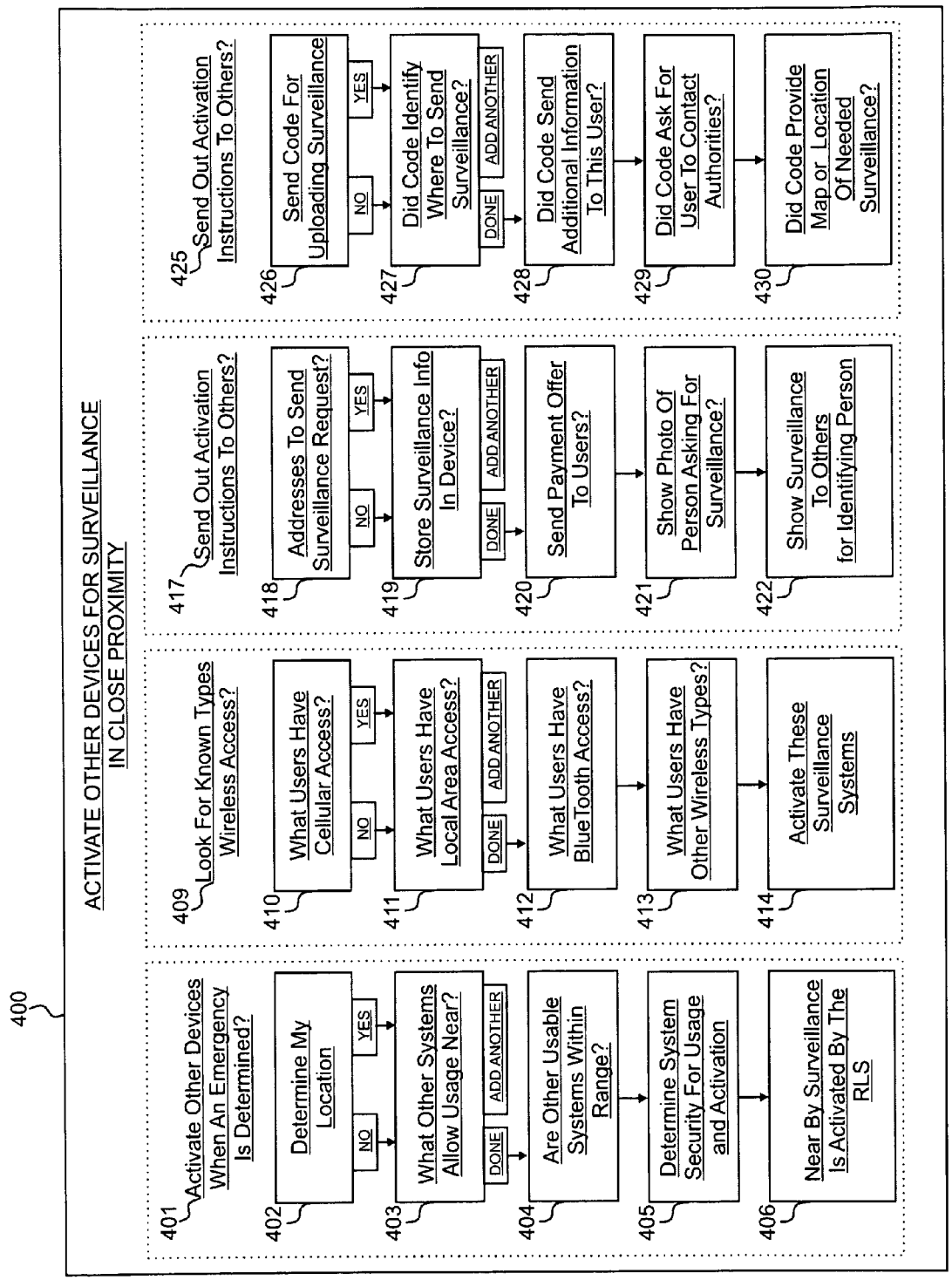

FIG. 7 is a high level flow chart diagram of an IPSS system of the present invention as applied to a user communication device enabled with image or video capabilities. As indicated in this diagram, the system allows the usage of others and their surveillance systems 400 nearby. As a deterrent, criminal activity will be captured on many devices, or alarms will activate to assist.

Figure 8:
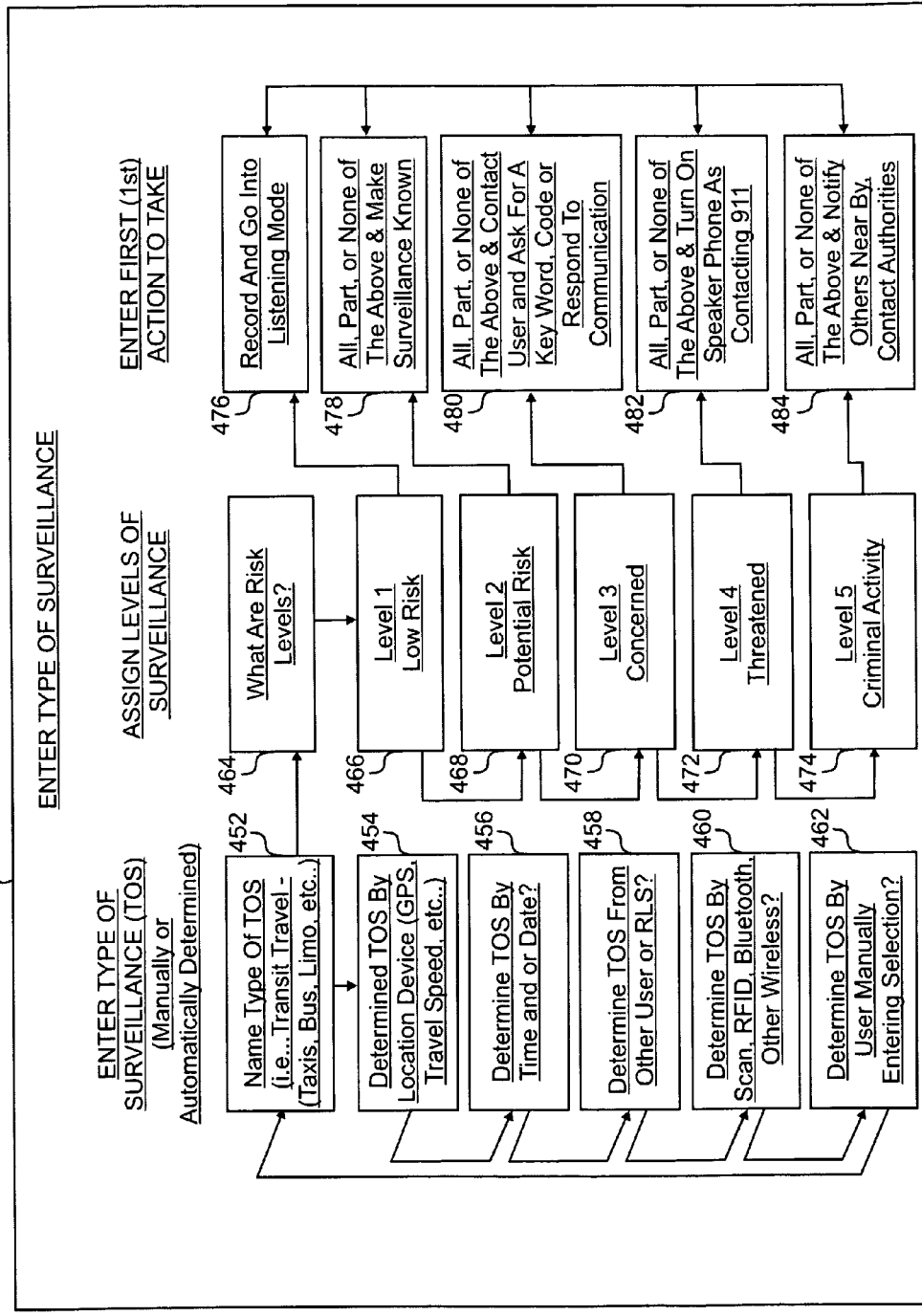

FIG. 8 is a high level flow chart diagram of the user definable "Type of Surveillance" 450 in the IPSS of the present invention as applied to a mobile device and/or the RLS system. As indicated in this diagram, the IPSS generally includes an area in the mobile device or online (internet) at or linked to the RLS that allows users to define surveillance settings that best suit their needs in one or more environments. In particular to FIG. 8, levels of security or surveillance will add-to, change, or replace the interactive actions to best accommodate each users environment(s). There are many ways to format the question and answers to obtaining correct user definable criteria from one or more users of the IPSS. Therefore, this flow chart focuses on the elements of "risk levels" and one, two, or more "actions to take" based on the user's risk level.

It should be noted that automation is used when appropriate to increase or decrease the levels (user risks or potential risks), as an example—Level 3 may require the user device to ring (from within or from the RLS) but if not answered or replied to (or otherwise), the system may automatically go from "Level 4" to "Level 5" (or any other levels). Or another example, in the "Listening Mode", any match may automatically increase or decrease the "risk level" and associated actions defined by the user.

Figure 9:
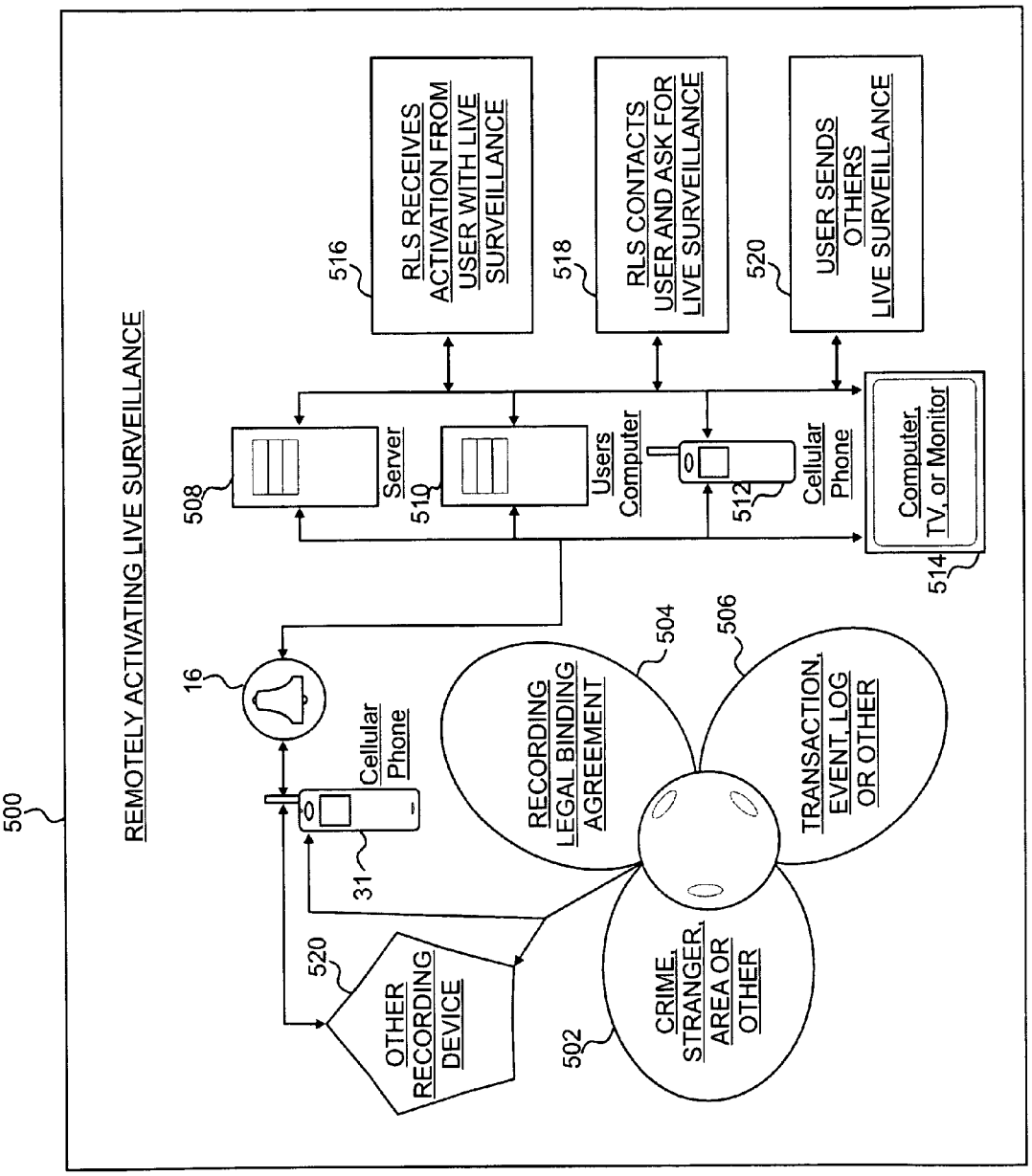

FIG. 9 is a high level flow chart diagram of an IPSS system of the present invention as applied to a user communication device enabled with image or video capabilities, as indicated in this diagram, the IPS system generally includes a server or home computer or both, and a wireless device enabled with video, images, and/or audio. The IPSS system may be used to capture agreements or documents signings and sent to legal or personal servers. Another usage of the IPSS is capturing events or logs that may be stored for later retrieval and usage. This could easily be used in place of signing by having the person say or agree verbally to a request. FIG. 9 also shows how a user's surveillance system may remotely be activated or controlled 500. For example, parents may automatically turn on their children's surveillance to hear or see (to check in on) how they are doing.

Figure 10:
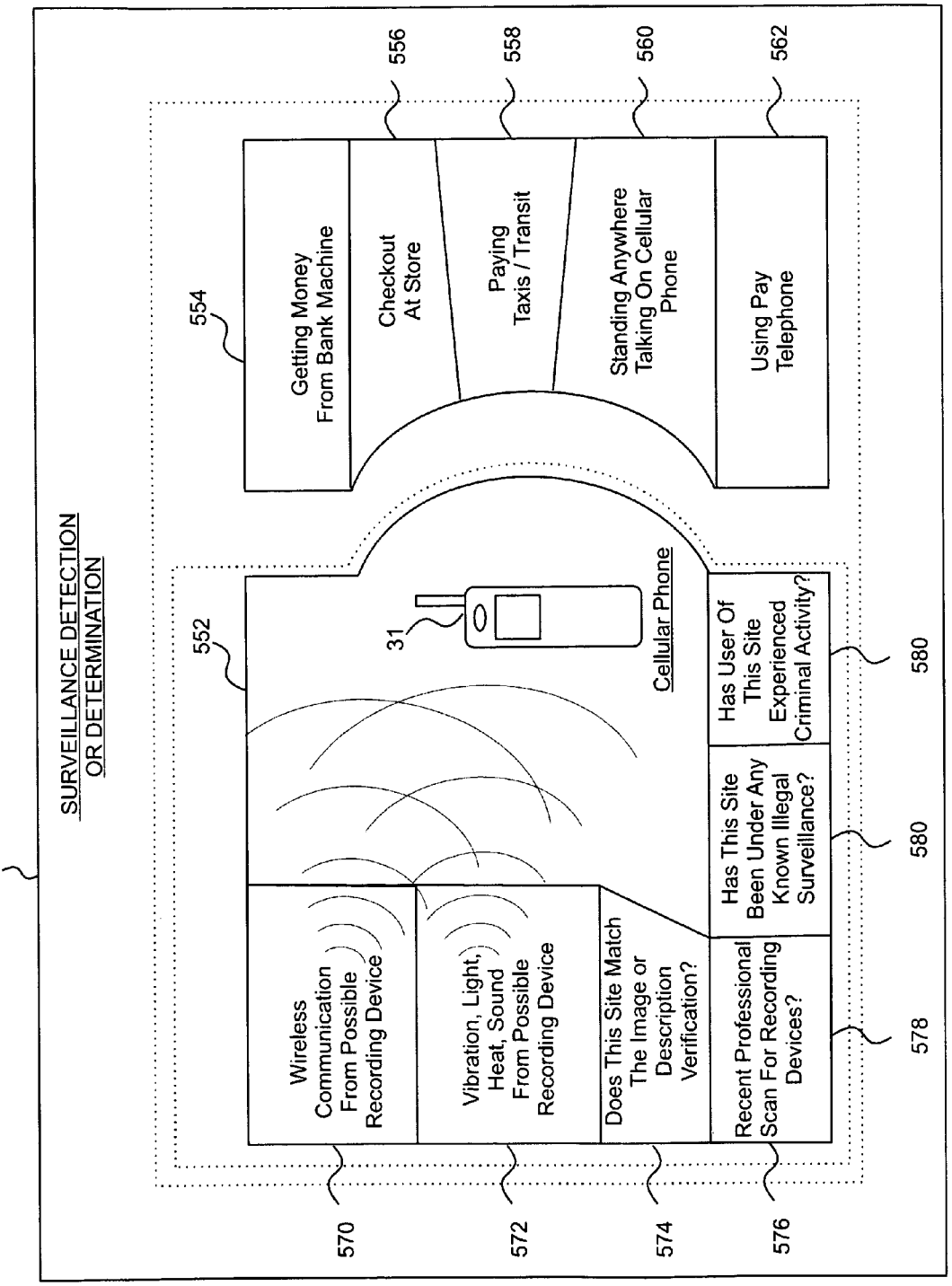

FIG. 10 is a high level schematic diagram of an IPSS system of the present invention as applied to a user communication device enabled with image or video capabilities. This invention uses surveillance to protect its user and the user's assets in many different ways. As shown in the diagram the IPSS may be used to protect from sharing of personal information or identity theft by detecting with others are recording 550 when users of the IPSS are entering confidential codes, passwords, and showing information (credit cards, account details, etc.) at facilities where illegal cameras, data-entry, or other capturing devices could take or steal information.

Figure 11:
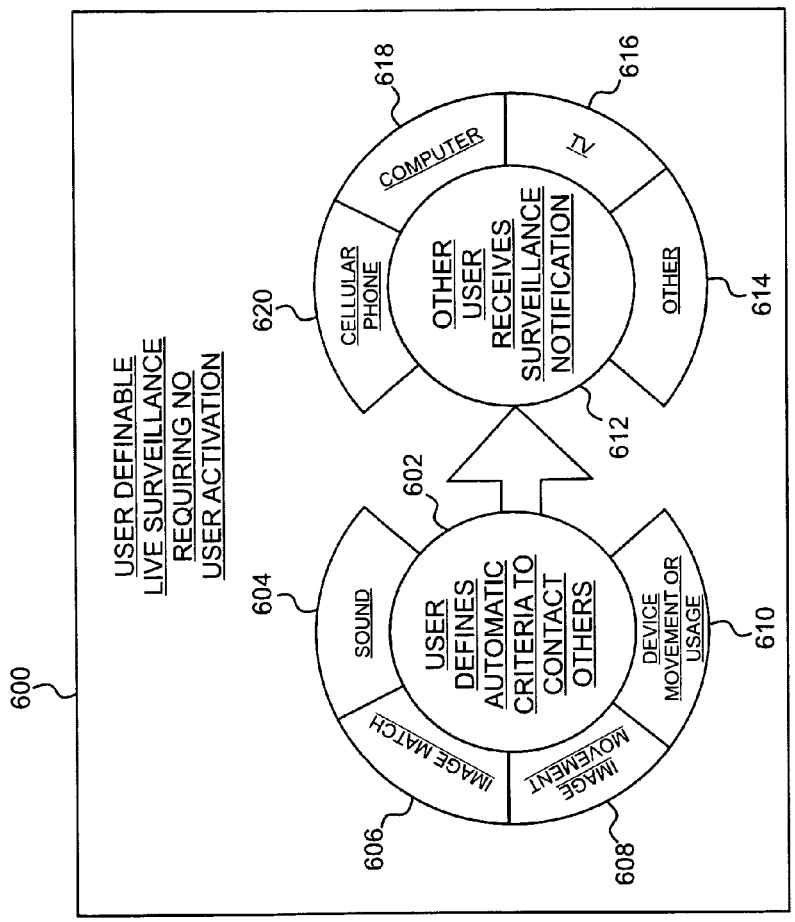

FIG. 11 is a high level schematic diagram of an IPSS system of the present invention as applied to a user communication device enabled with image or video capabilities. As shown in the diagram, the IPSS may be used to contact others when device or image movement is determined and/or matched or sound is determined. The device is capable of activating 600 based on sound, movement, time lapse, location, buttons or switches, or any other alarm type activation or method. For example, when the internal imaging matching software is active (live surveillance), and a user staying at a hotel points their WCD camera at a hotel door, if anyone comes into the hotel room, the system will automatically trigger and alarm.

Figure 12:
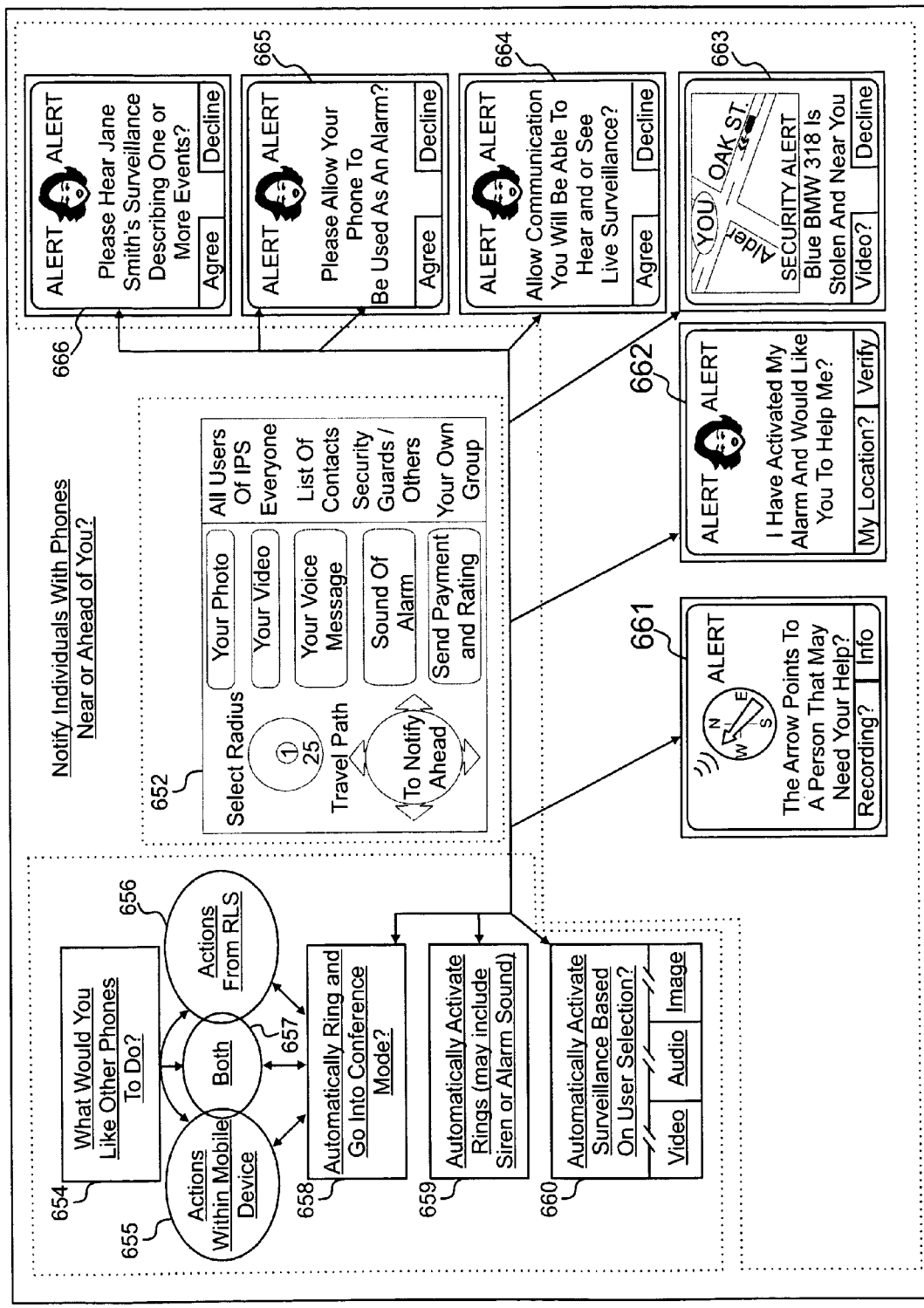

FIG. 12 is a high level flow chart diagram of an IPSS system of the present invention as applied to a user communication device enabled with image or video capabilities. As indicated in this diagram, the IPSS system may include a feature to contact other users and/or wireless device users nearby 650 and send these users information that may help the user requesting the information. As shown in the diagram, the IPSS may send out the location of the alarm, the direction, information about the user that activated the alarm, and other information that may assist the user.

Figure 13:
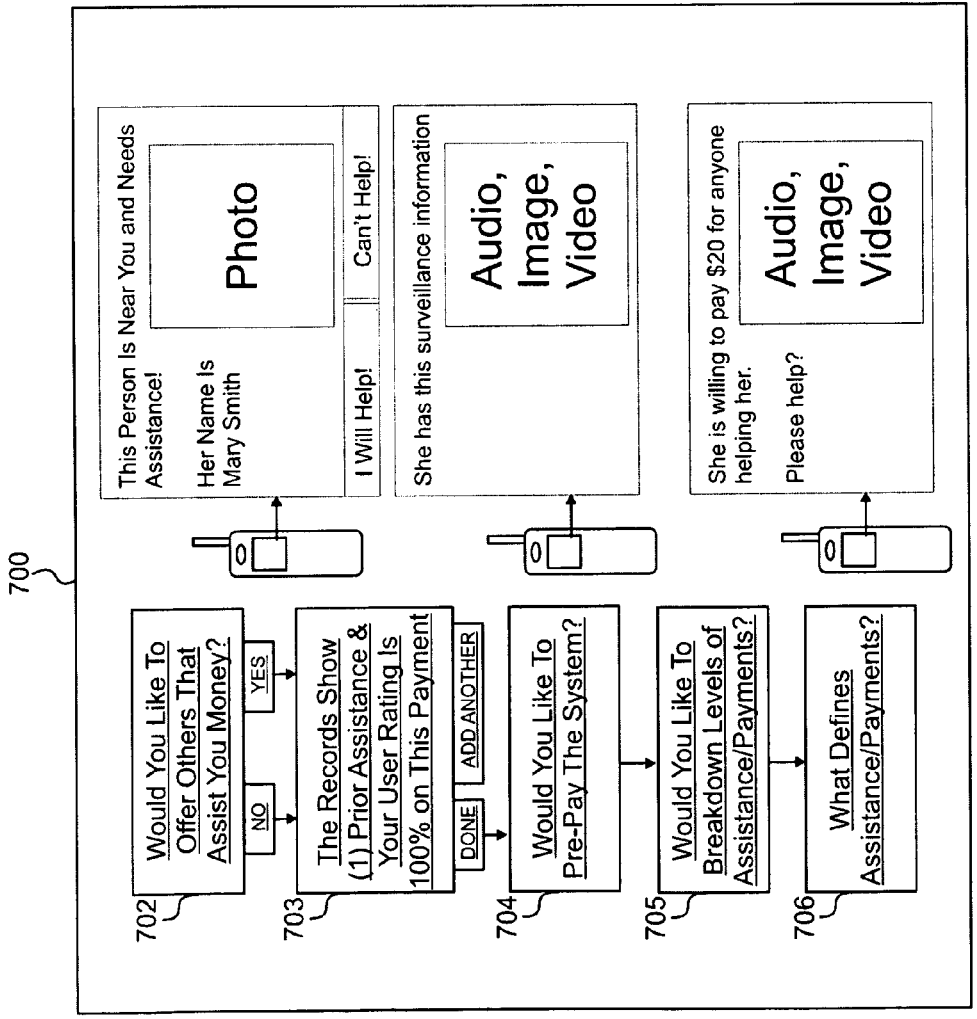

FIG. 13 is a high level flow chart diagram of an IPSS system of the present invention as applied to a user communication device enabled with image or video capabilities. As indicated in this diagram, the IPSS system may send out information 700 that will help people determine if they will or should help the individual. This includes payments or money offers for captured video/images, the payment record if available, a prepayment system for having the payment already available for paying out other users, whether the person has a criminal record or has misused the system before, and other items such as images of the user and videos or images of the illegal (or otherwise) activity.

Figure 14:
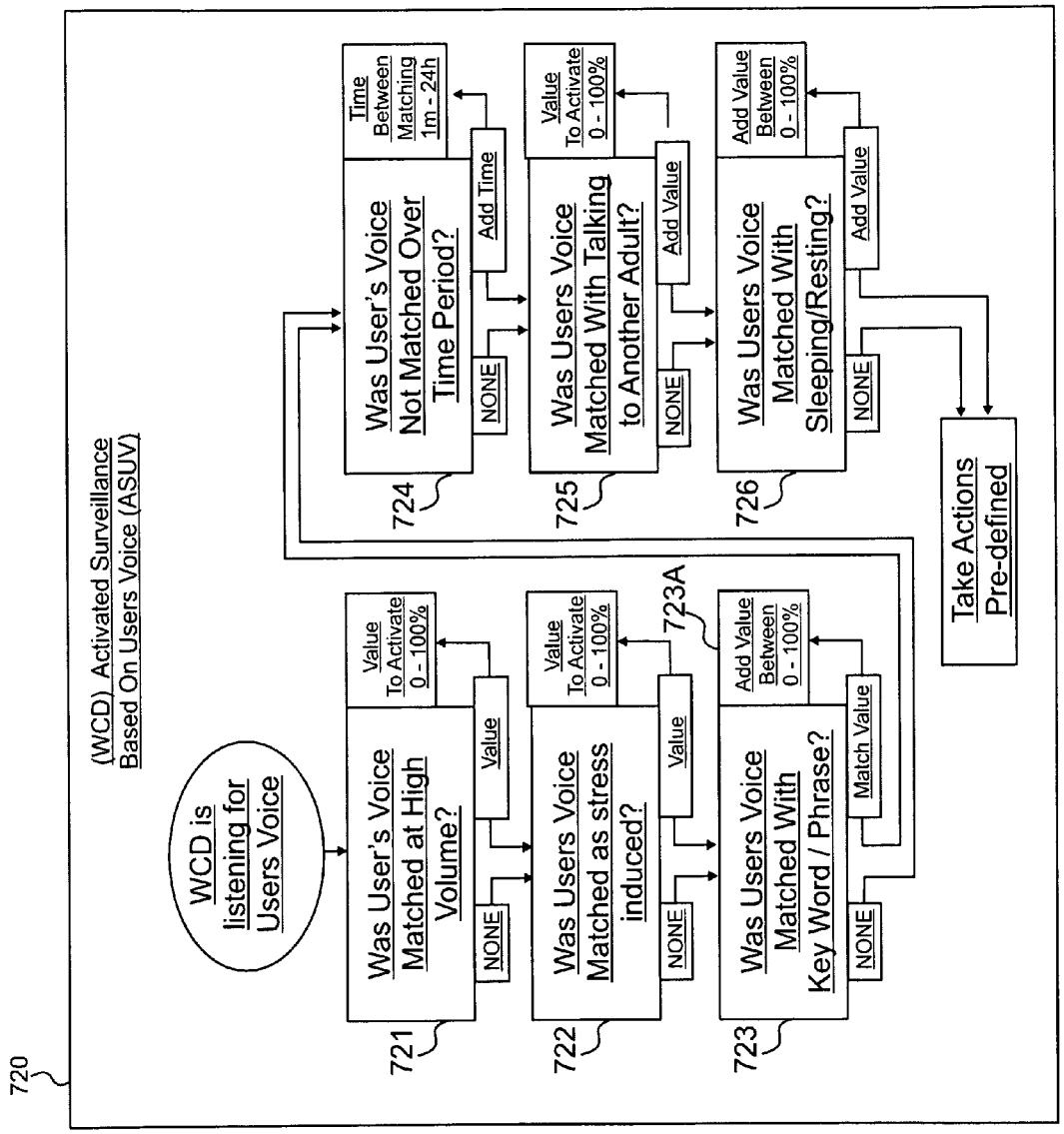

FIG. 14 is a high level flow chart diagram of an IPSS system of the present invention as applied to a user communication device enabled with image or video capabilities. As indicated in this diagram, the WCD may listen for the user voice 720 that identifies problems, security risks, or validation of normal activities. Some of the WCD listening may determine when the user voice is at a high volume, stressed, key word or phrase. Another form of listening is determining normal activities by matching the user's voice to what must be heard within preset time periods, talking to another person, or when the user is resting or sleeping.

Figure 15:
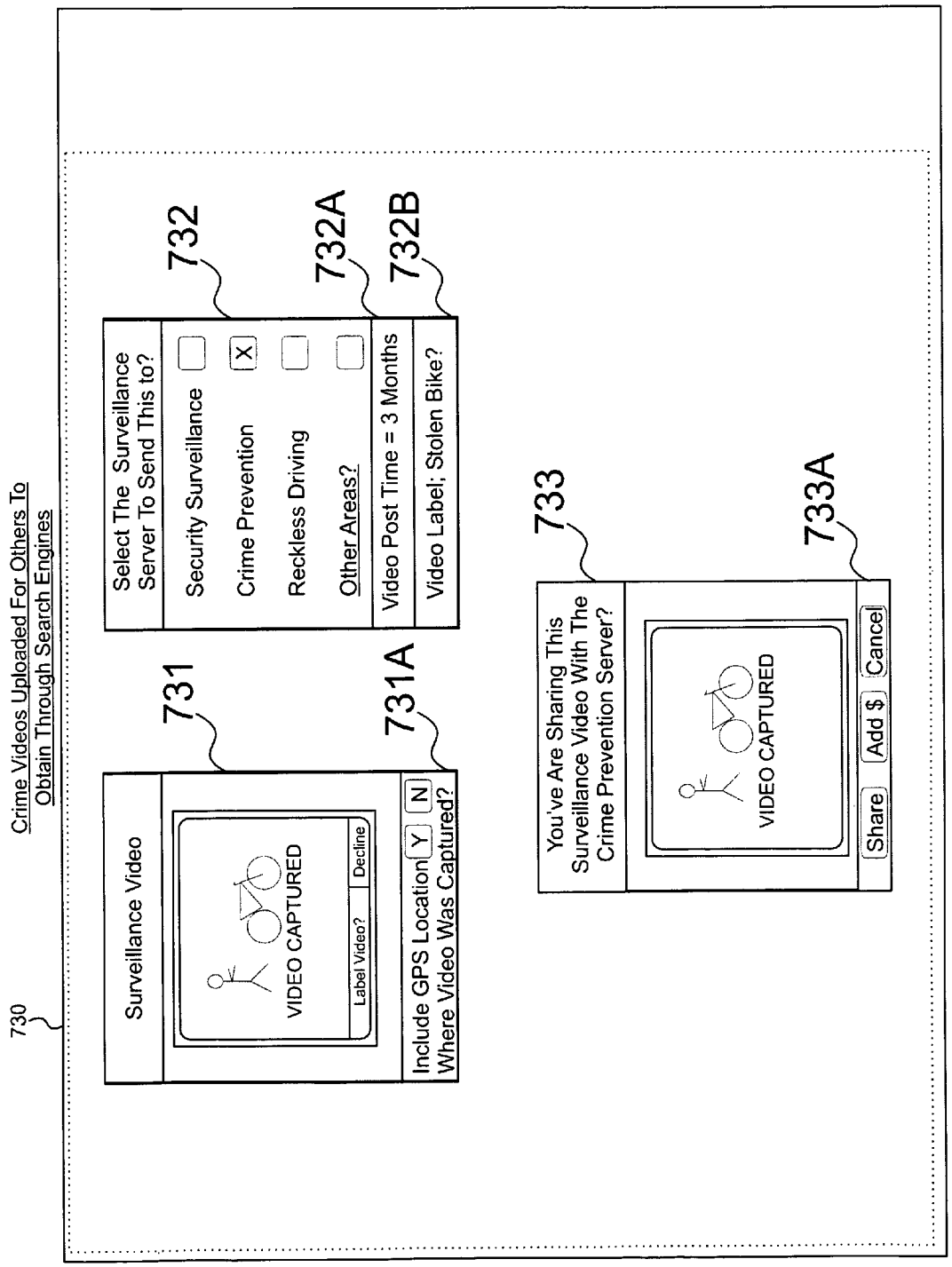
Figure 15A:
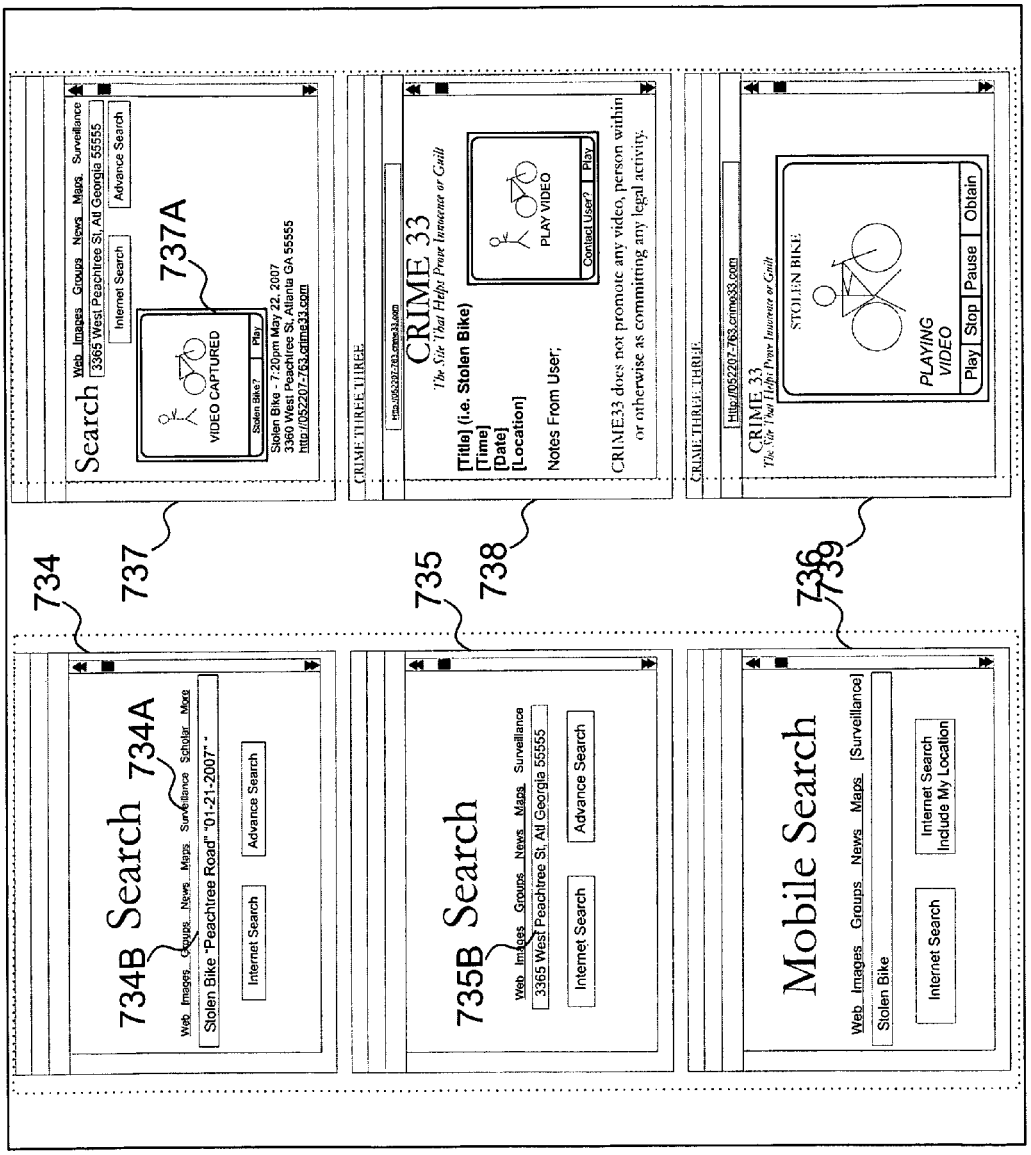

FIG. 15 is a high level flow chart diagram of an IPSS system of the present invention as applied to a user communication device enabled with image or video capabilities. As indicated in this diagram, the IPSS system may share or independently send surveillance information (videos, images, sound, sensor activity, user descriptions, etc.) to public "searchable" databases 730. For example, many users of the IPSS will witness and capture criminal or other important activities. Supplying this information to individuals or authorities becomes almost impossible without searchable descriptions such as time-of-day, day-of-week, location, type of crime (e.g., stolen bicycle), and descriptive information that may not be captured within the surveillance information.

It should be noted, this invention manages surveillance information as public, semi-public, and private. While many activities look like crime or criminal activity, the person may be completely innocent. Therefore, the system refers to activities as possible crimes also, makes publicly posted (or uploaded) surveillance information available to others that know a location, time, or date, of an activity. In the preferred embodiment, the user seeking random criminal activities must know part of the crime scene or crime, to obtain the information (surveillance).

Figure 16:
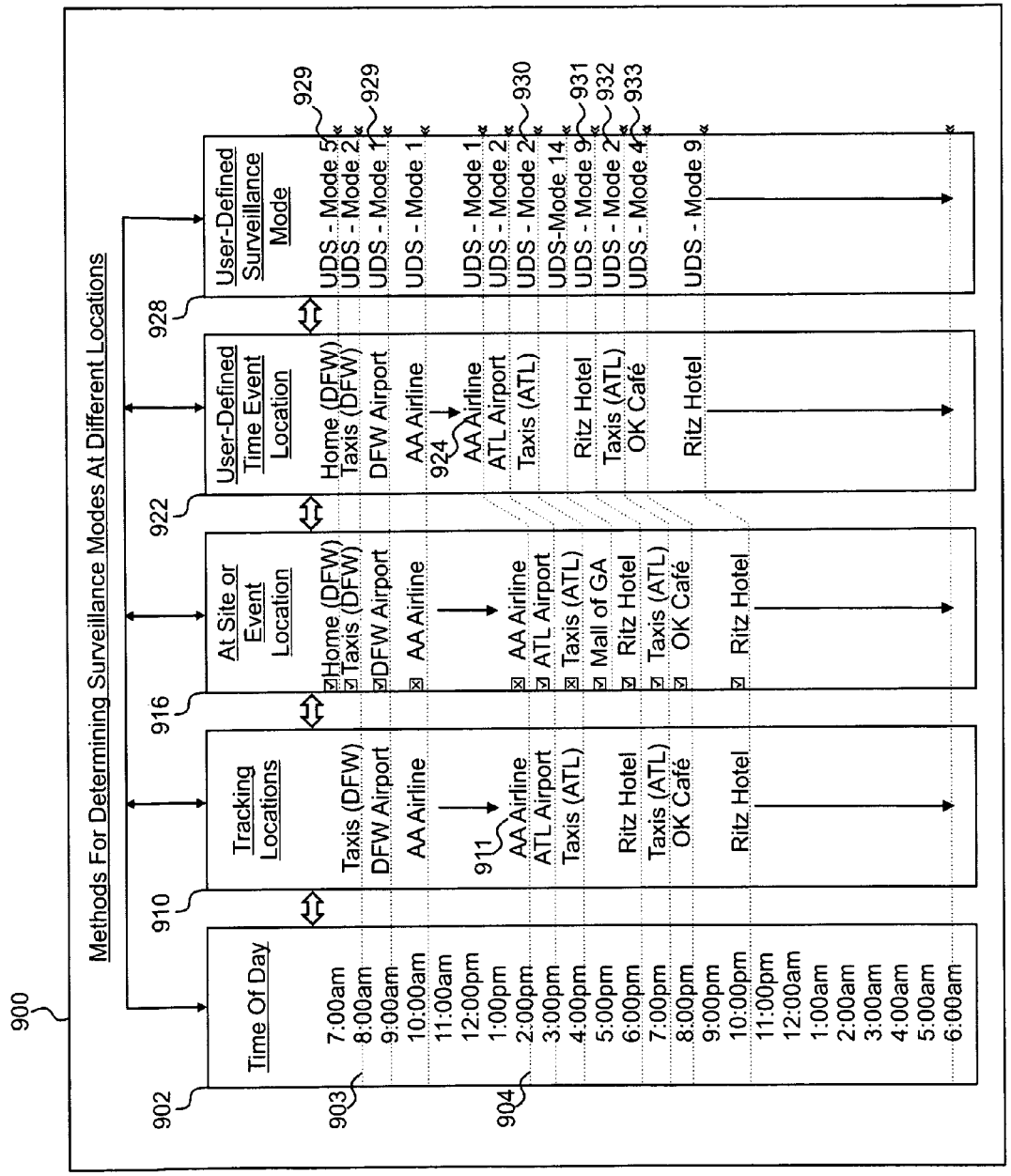

FIG. 16 is a high flow chart diagram of an IPSS system of the present invention, and as shown in the diagram uses different Surveillance Modes (SM) 900 based on one or more tracking systems 910, on site communication 916 that identifies the user's location, and/or time, dates or event 922. These different Surveillance Modes (SM) 928 are shown based on the user's location.

As shown in this flow chart diagram the user has selected or entered different Surveillance Modes (SM) based on location. For example, the user has entered different instructions for surveillance, alarms, and actions for identifying problems for home, taxis, airports and airlines, hotels, shopping and eating out (restaurants). For at least the purposes of determining when higher/lower or different types of security are needed, modes may be changed by these tracking events.

Figure 17:
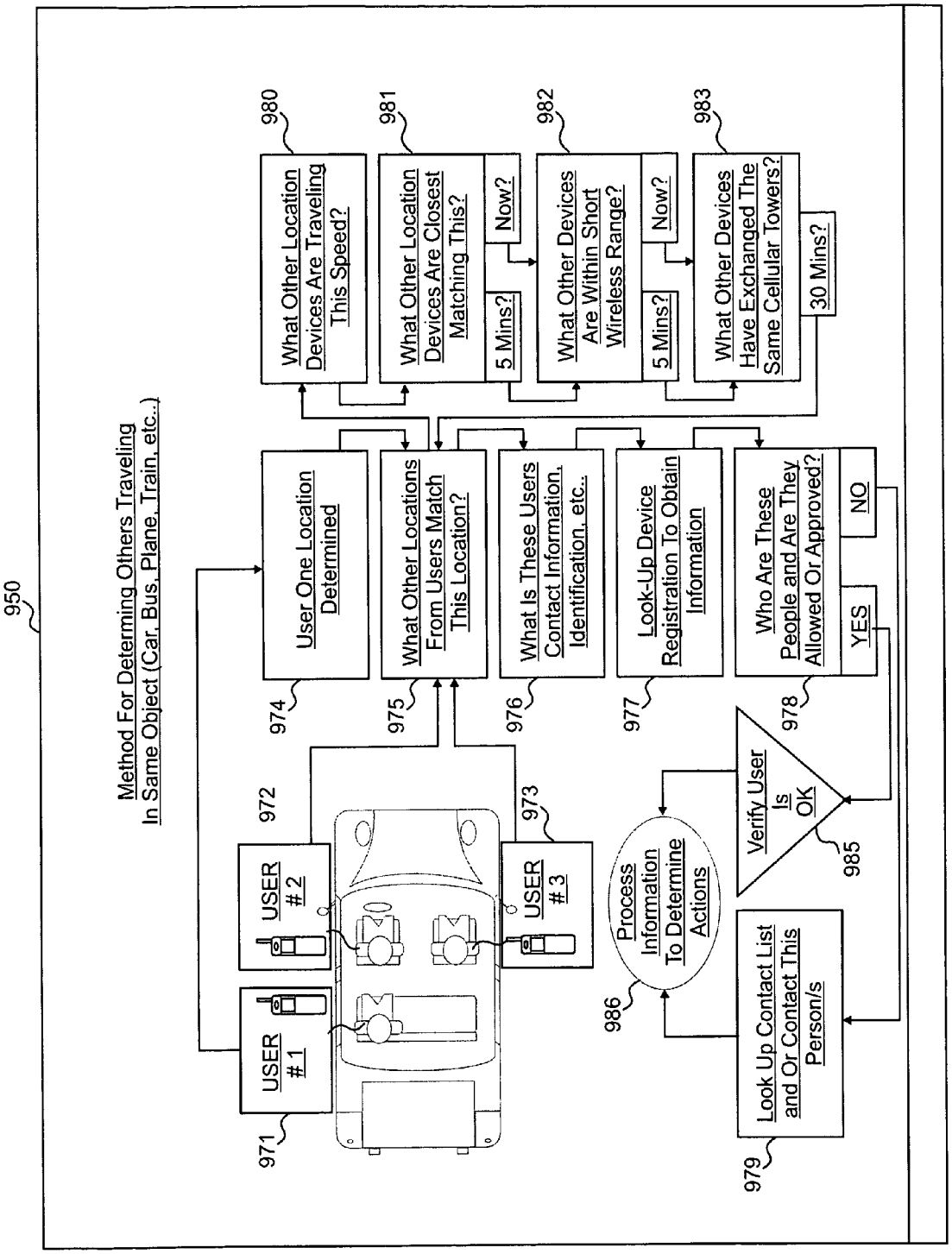

FIG. 17 is a high flow chart diagram of an IPSS system of the present invention, as shown in the diagram uses different Surveillance Modes (SM) based on one or more tracking systems 975, and may use this information for determining what other people are also in close proximity to the IPSS user. As shown in FIG. 17, by matching another person's tracking information with the IPSS user's location, one or more users riding in the same vehicle 950 may be determined. After the other people are determined, these individuals may be contacted by the IPSS system or by authorities. Another example of determining other people within an area (e.g., car, room, distance, etc.) is by having the IPSS user's WCD contact and obtain information directly from other[[s]] users' phones. It should be noted that capturing registration information and sending this encrypted information to the phone company for deciphering, is also a method for locating others within a close proximity.

Figure 18:
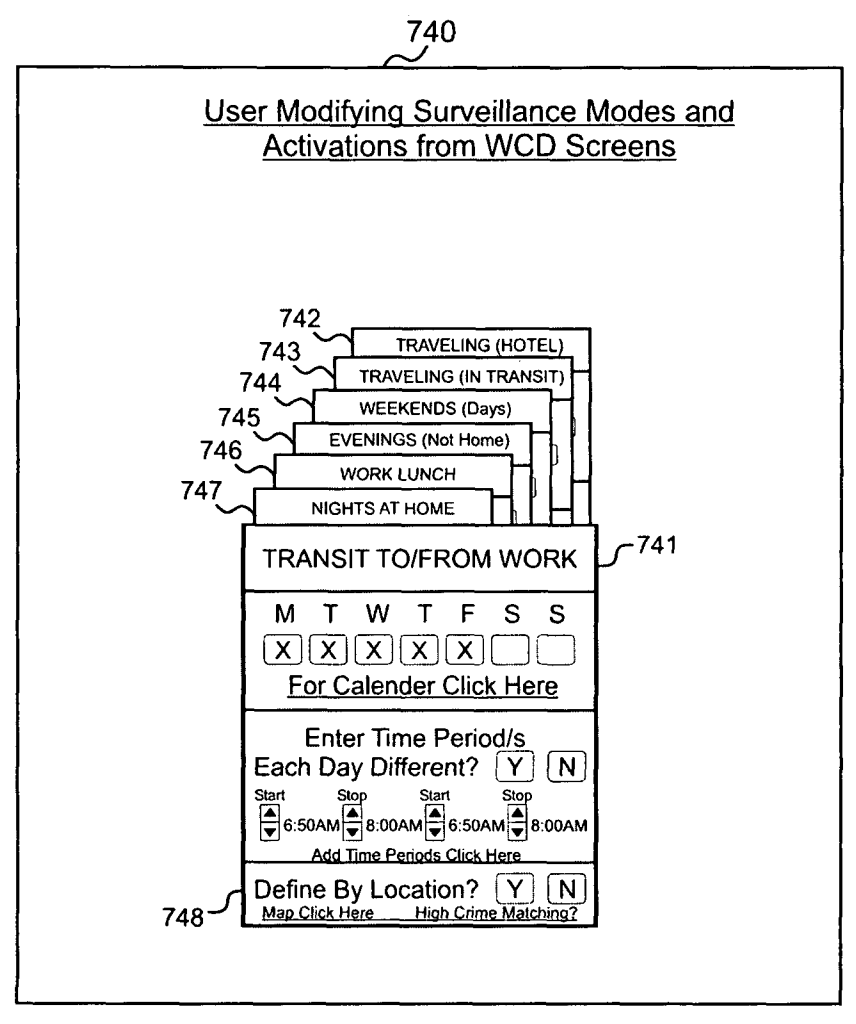

FIG. 18 is a high level schematic diagram of an IPSS system of the present invention, and as shown in the diagram the WCD screens allow the user to setup or change the IPSS system settings. For example, the user may have a new work schedule and need to modify the setting of their IPSS system. Also note the user may define these settings by maps of higher or lower known crime areas.

Figure 19:
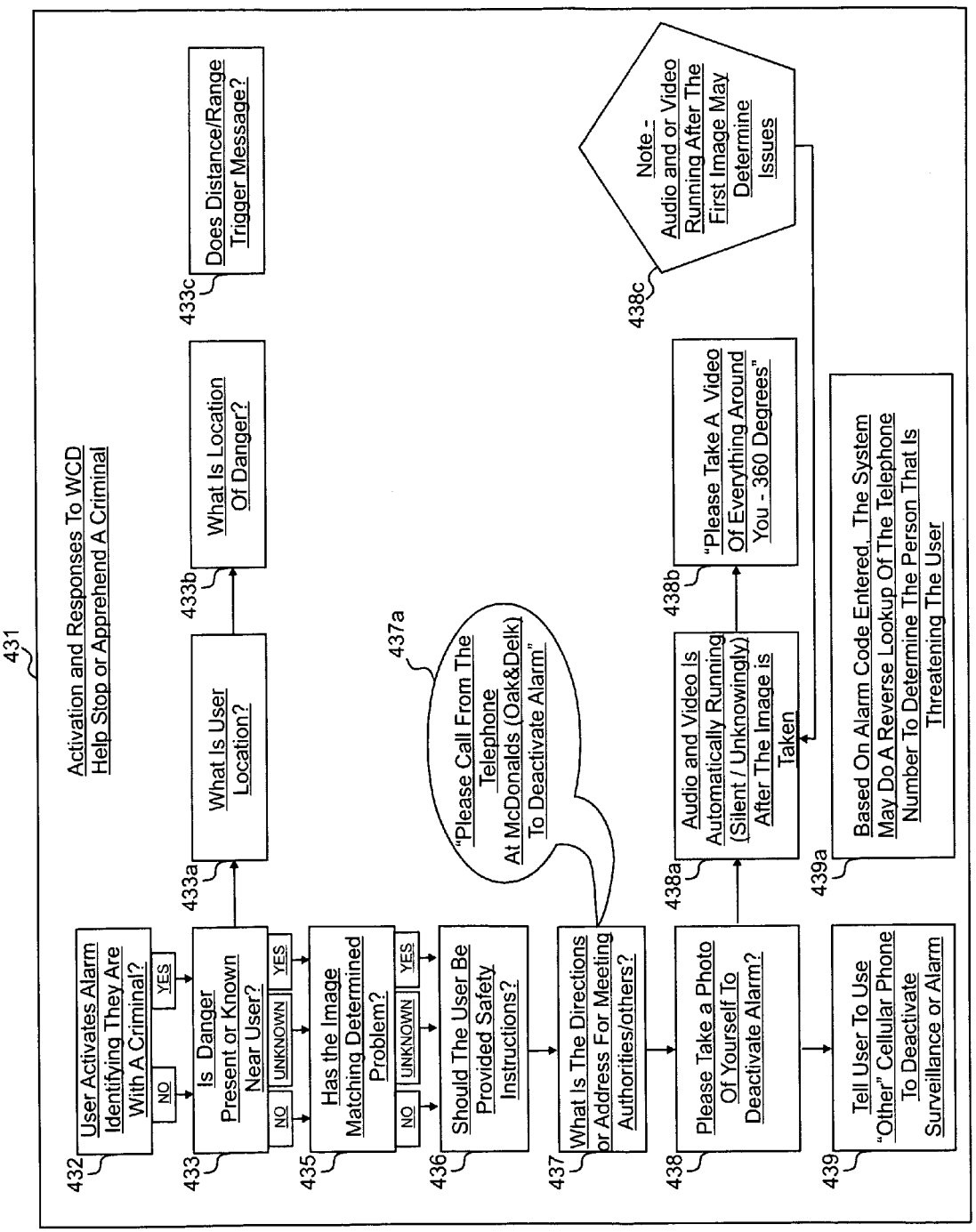

FIG. 19 is a high flow chart diagram of an IPSS system of the present invention, and as shown in the diagram uses systems to determine criminal activity, confirm and obtain additional information about the criminal, and allure the user and criminal to a capture area or an area that provides the user with a safer environment.

Figure 20:
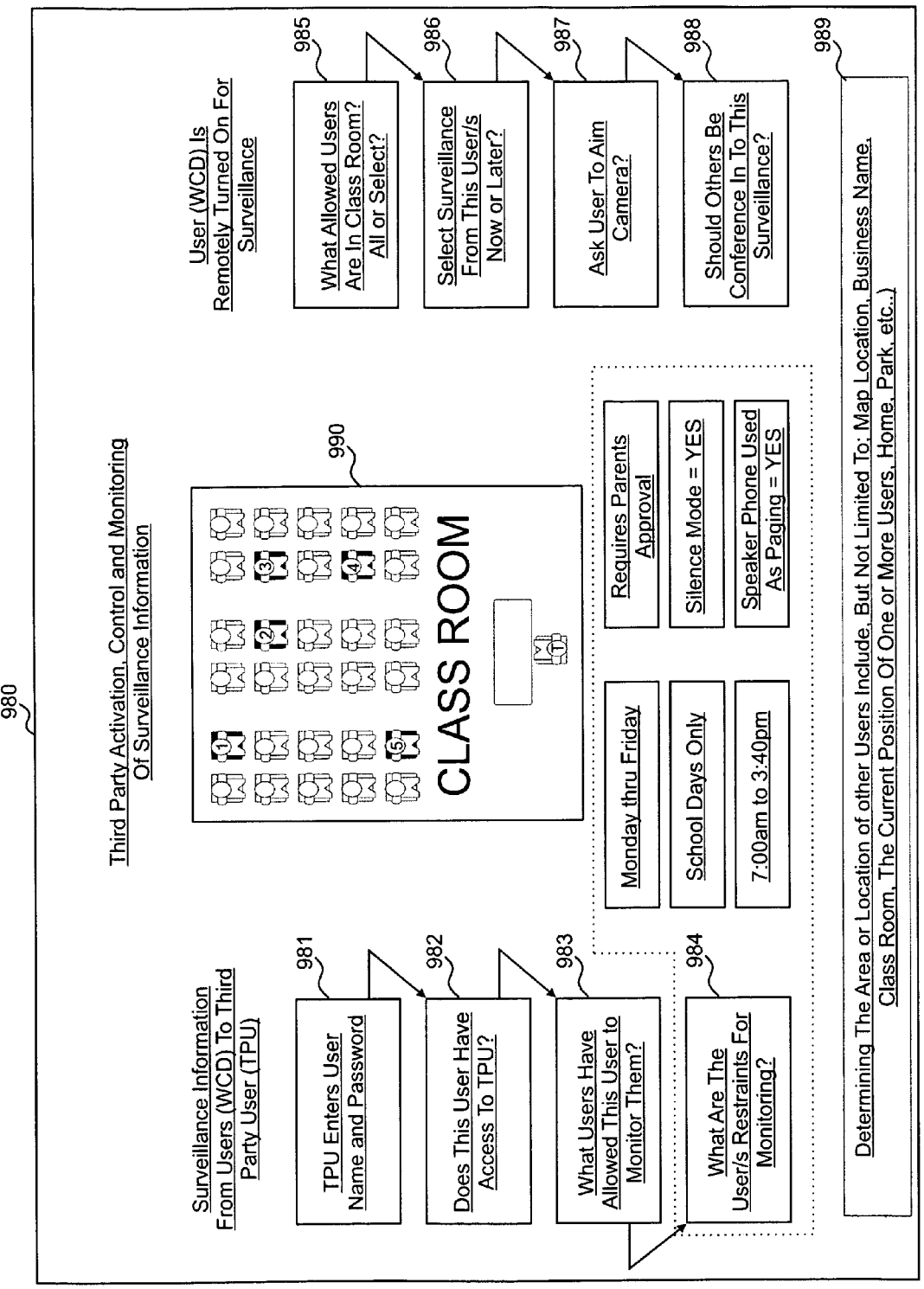

FIG. 20 is a high flow chart diagram of an IPSS system of the present invention, as shown in the diagram that shows how the system allows third party activation, control and monitoring 980.

Figure 21:
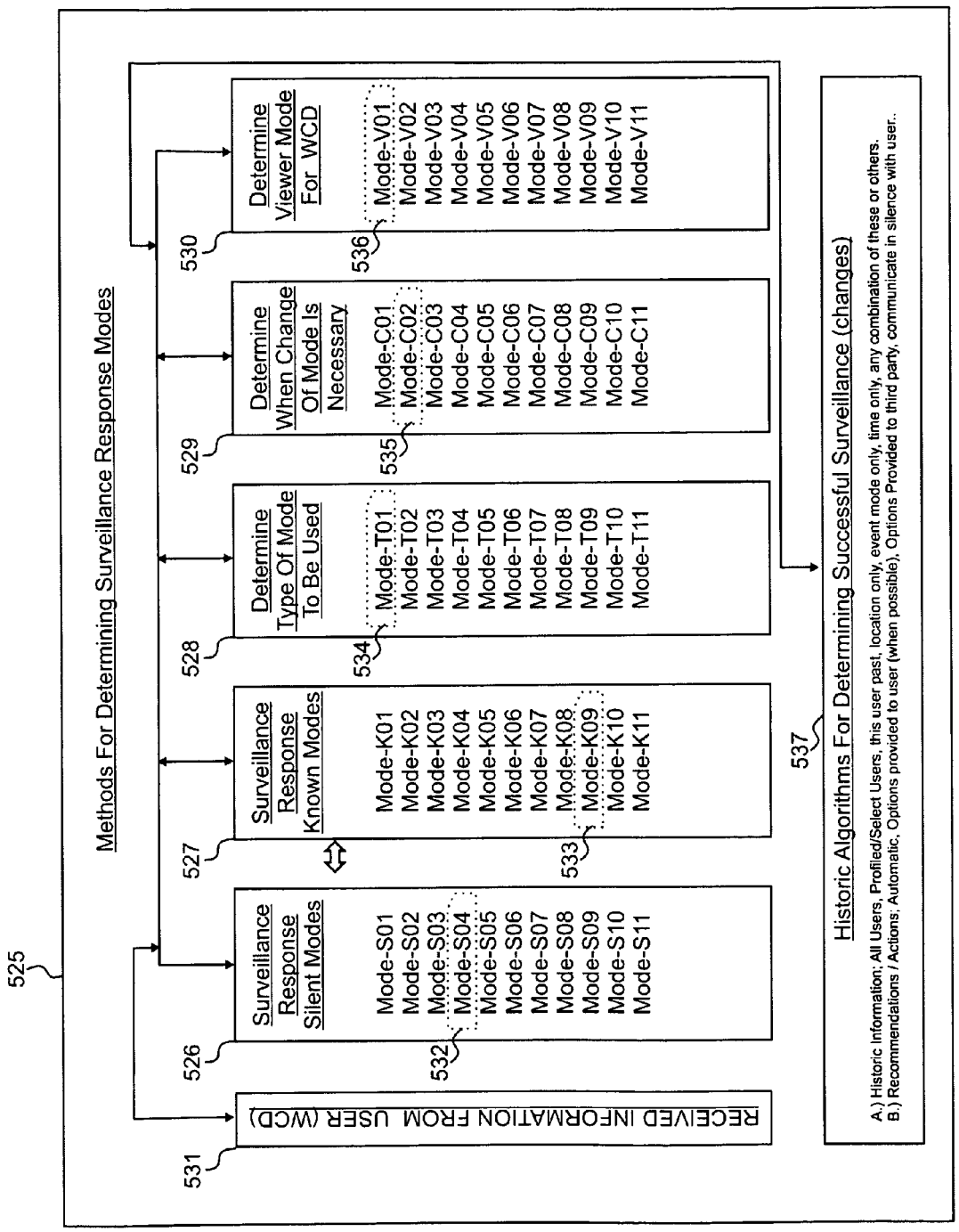

FIG. 21 is a high flow chart diagram of an IPSS system of the present invention, as shown in the diagram for determining surveillance response modes 525. Response modes may be dynamic 528 and constantly changing based on the users location, time of day, safety or risk level, sensor activations, and many others. Response modes may include, but not limited to, silent responses, known responses and control of the WCD including the screen, lights, sound, camera, and others. Algorithms for determining changes may also include historic successful modes, along with other current and user/system selected modes.

Figure 22:
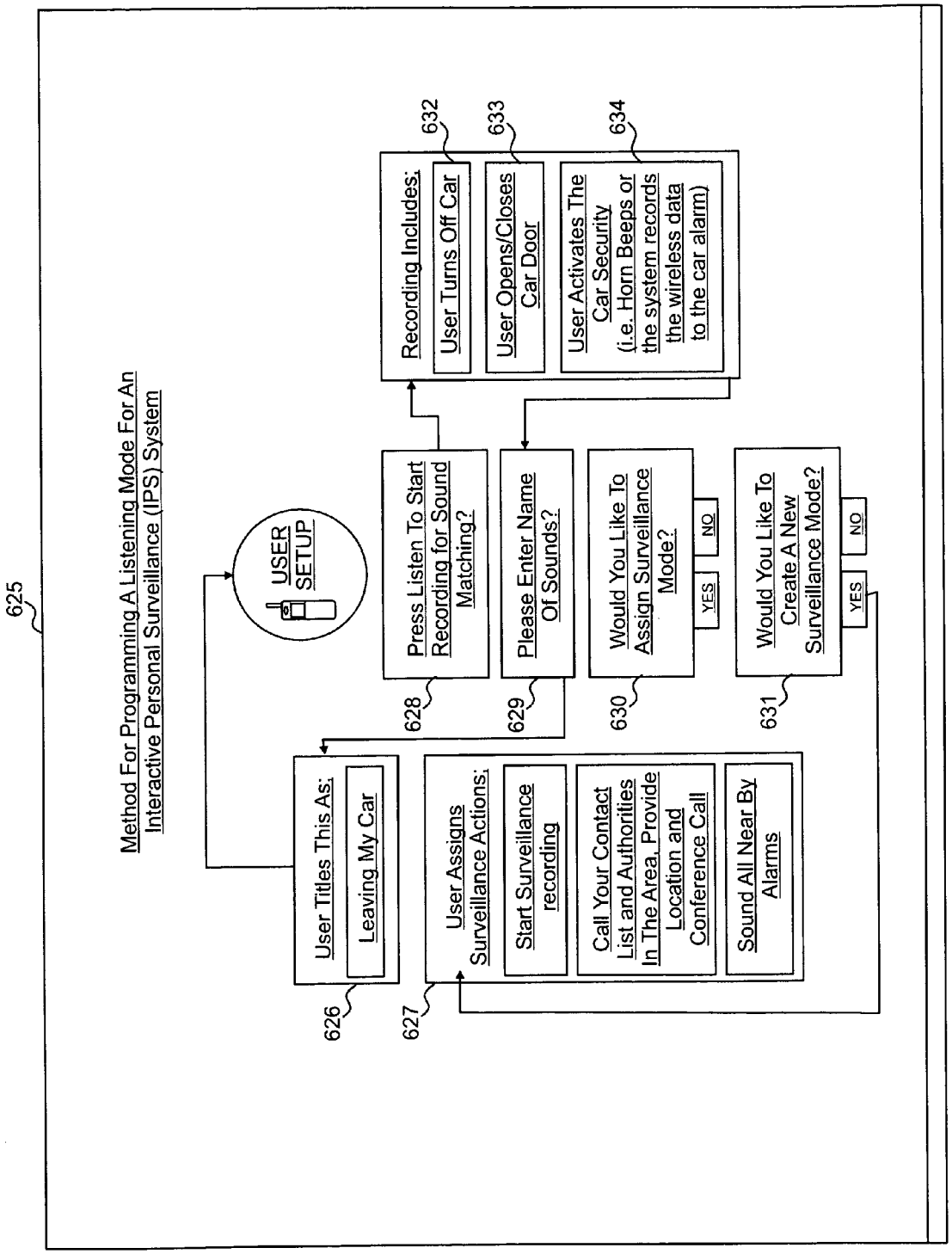

FIG. 22 is a high flow chart diagram of an IPSS system of the present invention, as shown in the diagram for programming one or more listening modes. This diagram shows how the listening mode is programmed. For example, the user programs it for "leaving their car" 626 and automatically identifying these sounds (i.e., engines turning off 632, car door opening and closing 633, and the engagement of the car security system 634).

Figure 23:
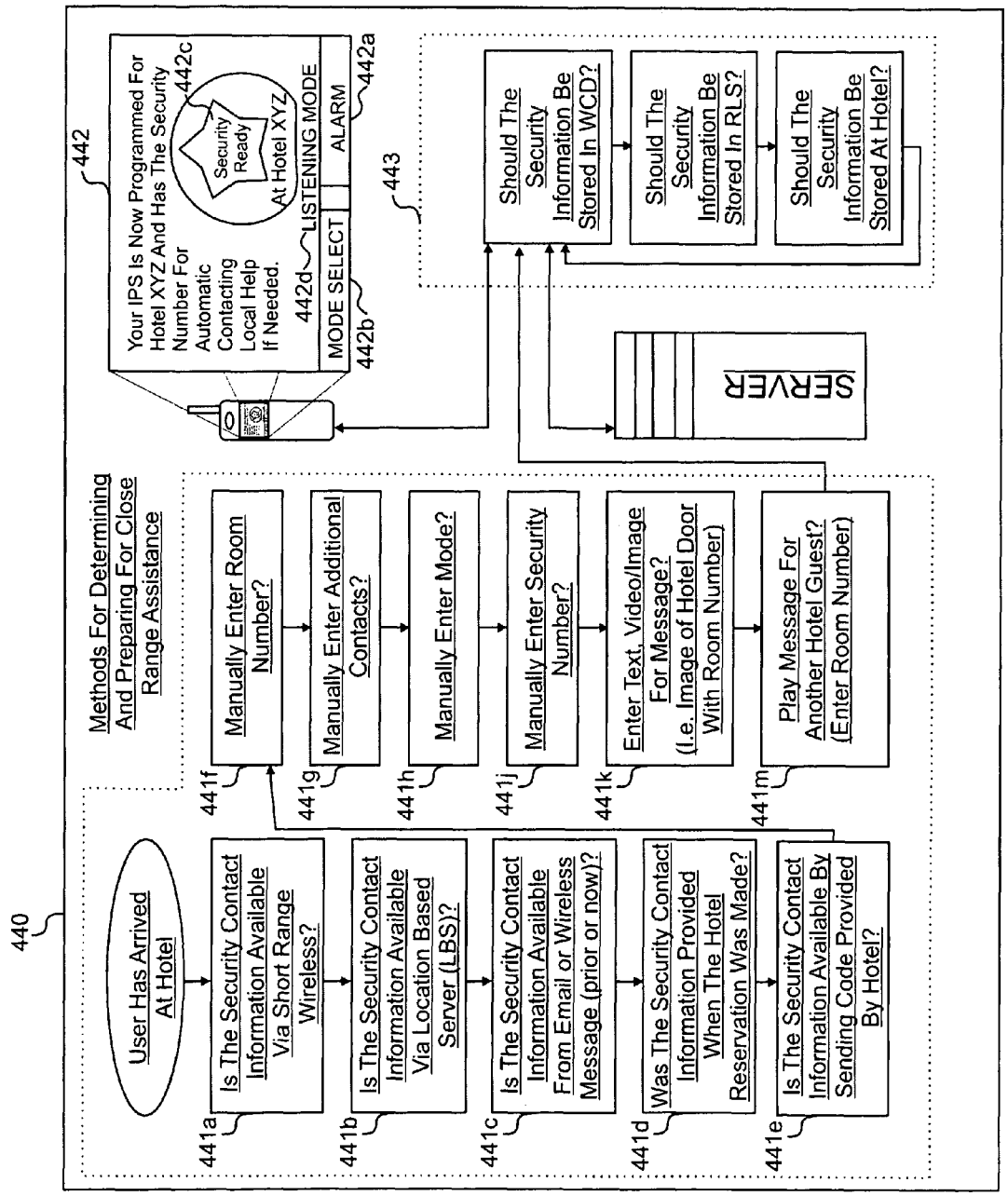

FIG. 23 is a high flow chart diagram of an IPSS system of the present invention, as shown in the diagram for determining and preparing for close range assistance (when needed). This feature of the present invention allows the IPSS system to quickly contact help that is close to the user. This diagram shows some of the methods for obtaining contact information and sharing it. When an activation of an alarm occurs the system will already have been programmed with local contact information. While in the preferred embodiment, other events will also engage with an alarm, including but are not limited to, the WCD sounding an alarm, other nearby alarms being activated, others willing to help and close by being called, the police being called, conference call being made, video being sent from user, mode being changed based on events and time, etc.

FIG. 24 is a high flow chart diagram of an Enhanced Interactive Surveillance system of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. These embodiments are provided so that this disclosure will be thorough and complete and will fully convey the scope of the invention to those skilled in the art. Like numbers refer to like elements throughout.

Referring now in more detail to the drawings, wherein like reference numerals designate corresponding parts throughout the several views. FIG. 1 is a schematic diagram of an IPSS system 10 of the present invention, as configured to operate for example, including but not limited to, a user communication device capable determining movement and location, automatically activating security and surveillance measures/information, including video, still images, and/or audio, and sending this information to a RLS system.

The IPSS system 10 includes, software (or firmware) operating on the user WCD 30 which interacts or controls many of the WCD features including the camera capable of capturing video or still images (and or audio), communication capability that includes uploading 21 or sending live information 22 wirelessly to a RLS 12 server for the purpose of storing surveillance information away in a secure area from the user's WCD and for activating and/or monitoring the user activity for future activation of alarms or assisting the user as needed or required, and the ability to listen (or compare images) for events that will change the surveillance mode(s) or activation of alarms.

The RLS system 12 manages a plurality of users with wireless communication devices 30 and/or, as depicted by FIG. 9, the RLS system may be configured to receive the user information at their own computer 510 and/or one or more servers 508 (or any online storage facility) for the purpose of securing the captured surveillance information and therefore making it almost impossible to delete or destroy.

As configured in the interactive personal surveillance 10 system, a RLS system, WCD, or both, automatically determines what, if any action is needed/required when surveillance is active or activated. Based on the User Definable 82 entries and/or the System Processes 84. Some of the follow up actions require the RLS 12 to contact the user, others, and/or online databases for potentially increasing the user's safety (or otherwise) through predefined criteria.

Activations of surveillance and alarms are determined automatically, based on user or system definitions/programming, and/or manually. Listening Mode allows the user device to hear sounds, receive data from other wireless devices, and take images or videos for determining if or when surveillance modes should change or when alarms are needed. This automatic Listening Mode may operate independent of the user, with user reminders, or requests for instructions.

I. Personal Wireless Communication Device Used for Surveillance

The WCD 30 will now be described with reference to FIGS. 1A, 1B, 2, 3, 4, 5, 9, and 10. Referring first to FIG. 1A, each WCD 30 includes common voice and data wireless communication as found in cellular phones, these devices also having a camera capable of taking images or video, the ability to run software or firmware, and optional equipment such as short range wireless (blue-tooth or other), GPS, or location determining technology and sensors (that may detect shock, motion or movement, smoke, light, sound or video, impact, user's physical condition (e.g., heart rate and/or blood pressure), human presence, etc.).

The software operating inside the WCD is capable of sending and receiving information and changing one or more surveillance operations.

II. Software Installation and or Setup on User WCD

The WCD can be configured on the RLS before downloading, during or after installation. An example of the software options are, but not limited to;

Please identify your cellular phone or wireless communication device from list or enter model number.

RLS sends (uploads) surveillance software to the cellular phone or wireless communication device Configuring software during installation (Users WCD, RLS website, or both);

1.) Does your phone have an extra memory card? Y/N—If Yes what is its size?

2.) Does your phone have a camera? For video, pictures, or both? Still images only?

3.) Does your phone have GPS or other location technologies? Y/N

4.) Does your phone have sensors, such as motion, light, Glass break, sound identifying, impact or other sensors? Y/N/ Do Not Know 5.) Does your phone have text messaging capability? Y/N 6.) Does your phone have internet access? Y/N 7.) The software will do a system check for determining more features your phone has to work with the IPSS system. Part of this system check will determine: the battery life per full charge cycle, communication options and abilities, if the mobile device screen may be modified when surveillance (silence mode), and if the alarms are activated.

8.) Will you allow the surveillance software to stop the phone from being powered off, when alarms or surveillance is activated? Y/N This feature stops anyone, except yourself from turning off and stopping your alarms and surveillance. You will be required to enter a code to turn the phone off when surveillance or alarms are activated.

9.) Will you allow the surveillance software to control your cellular phone screens, lights, and indicators? Y/N This feature allows the RLS and the cellular phone to manipulate the cellular phone screen/indicators to imitate power off screens and looks, offer onscreen information and assist you in many ways when or if needed.

10.) Select one or more hot-key/s for activation of Listening-Mode (LM)? This feature allows your voice and sounds to be monitoring for the activation of surveillance or alarms. For example, you say "help me," and this phrase activates an alarm. You may add as many phrases as you would like and tell the IPSS system what to do afterwards.

11.) Select one or more special Hot-Key(s) for activation of surveillance

12.) Select one or more special Hot-Key(s) for activation of the alarm feature. You may select the same key as the surveillance activation but pressed three or more times in a row.

13.) Would you allow the phone to be programmed with sound matching? This feature allows the IPSS system to learn sounds and wireless data to match them with your own user-definable actions. For example, the sound of the car turning off and open door sound (bell ringing), will identify you exiting your car and your IPSS system could go into a higher level of security than when you were in your car traveling.

14.) Would you like the system to verify its working? Y/N Because the WCD interacts with the RLS system for sharing information, it is recommended that all of the foregoing features be employed to provide redundant checking and control of communication. More specifically, the system menu within the RLS system website offers scheduled communication checks between itself and the WCD carried by the user, or the setting may be defined within the WCD. It is recommended that communication is verified, based on time of day/night and activities. If this setting is set to global and communication is verified evenly 24/7 then 10 minutes to 1 hour is recommended.

15.) Would you like to activate the learning mode of the system? Y/N The learning mode offers onscreen selections for helping the system identify and verify locations, businesses, transit, walking areas, friends' places, and areas or events you encounter. For example, while traveling on the transit bus scroll down and select "Bus", the system may ask you additional questions such as, "do you ride the bus each day? Monday thru Friday? Please enter the time periods you travel on buses. Do you always travel to the same stops? This information is then shared with the RLS, and a surveillance mode will be assigned to this action. For example the surveillance mode may be listening for key phrases such as "get away from me", "security", "help me", etc.

16.) Please allow the ring-tone "alarm" to be installed within your phone. The ring-tone alarm is a special sound that is used when the surveillance alarm is activated. Additionally, if the special sound is heard (or data is shared) by other users' systems, their alarms (if sound matching is enabled) will be activated as well.

III. Operation

After the software is installed, the tutorial comes on screen and asks the user to follow the basic (normally 4 minutes) or advanced (normally 10 minutes) instructions and final setup procedures. The user enters their user name (e.g., Mary Jones) and the password (e.g., 12345678). As this is entered the WCD attempts to connect and verify the account and communication with the RLS. After this is verified the IPSS system starts the interactive programming process.

The user reads from the WCD screen phrases such as, "Security, Security Guard, Police, I need Help, Get Away," and other preprogrammed phrases and the users voice is matched with each phrase. Then the system asks if the user would like to add any additional phrase. The user may type in the phrase and then record the word or phrase.

Next, the user will be shown surveillance modes. These are actions to take when particular occurrences are acknowledged, determined, or activated. Surveillance modes are normally associated with one or more criteria, such as, risk levels, user activity, actions based on activity, interactions for changing the current status of surveillance or alarms, or many others based on circumstances of the user.

The user assigns an action with a phrase, for example:

Listening Phrase="Security Guard"

Surveillance More="Level 4"

"When you mention the phrase "Security Guard", these actions will (1.) automatically, (2.) prompt you first, or (3.) display on screen with count-down with/without sound prompts, then automatically, unless cancelled with a code, activate a level 4 surveillance mode of programming. Level 4 includes starting recording, making surveillance known by alarm sound, stopping alarm sound, and turning on speaker phone when connected with 911 or other security or monitoring agency.

In the example above, when the user's device is in listening mode and hears the user's voice say "security guard" the phrase activates a level 4 surveillance mode. This activates live recording of audio and video, sounds periodic alarms, sends a message to the RLS to notify the closest security (mall security guard or 911), and turns on the speaker phone when the security agency answers the call from the RLS.

With reference to the surveillance modes, essentially an endless number of modes are possible although the system normally provides a preset template of normally between 3 and 10 modes. In many cases the modes are modified to include or exclude actions and are renamed.

Also the IPSS system has a constant learning mode that ask the user questions as it hears, receives sensor inputs (e.g., "are you walking" or "snow skiing"), or observes images. The process may ask the user, if this sound or image name is correct; (as an example—"was this sound your transit bus?" Or "was this sound your home door bell ringing?" Or "is this sound street traffic or cars as you walk?". This allows the sounds to be matched more accurately with modes of surveillance. While modes are matched with many things (location, time, etc.) this helps to cross reference or provide the best decision if it's the only element available.

Sharing Surveillance With Public Server (information available for internet search engines).

The IPSS system is setup to capture surveillance information to help the user and to keep the information private, but sometimes it may be used to help or assist others. This second party surveillance recordings (recordings of others or crimes not involving the user) would be sent to a public (searchable) server, database, or website and allow the user captured recordings to be found by victimized individuals. For example, if a user captures surveillance information that may or may not contain a crime, such as someone breaking into a car, breaking a lock and taking a bike, or strange or suspicious van parked in a driveway, this information can be posted on an internet assessable website (automatically sent to search engines) for anyone seeking evidence of an activity.

To post this information on a website, the user selects "send to public website" and then enters their user password. Additional information such as time, date, location, etc. may be automatically sent and other details may be manually entered.

IV. Remotely Located Surveillance (RLS) System

The RLS operates as, but not limited to, a remote storage area(s) for recordings (away from the WCD), a system for interacting with the user/WCD, a system for determining how to assist and for assisting the user, controlling the WCD or one or more functions of the WCD, and communicating with other systems, users, people, and agencies/companies.

Remotely locating the surveillance information (video, image(s), sound, sensors, location, and other information) helps to protect the information from being erased or stolen. In an example of a stranger approaching the user and stealing their WCD, the surveillance information of the criminal remains safe within the RLS. Additionally, the information within the surveillance may be automatically annualized.

V. Remotely Located Surveillance System Control Processes (SSCP)

The SSCP determines how to assist and manage information that it receives. The SSCP is also preferably configured so as to be capable of determining what each individual user wants or requires based on alarms and receiving surveillance information or based on sensor inputs that are known by the control processes. For example, each system control process may have a unique action for instance, a command signal initiating a simple on/off communication with a WCD speaker phone. It may turn on/off a system component comprising a camera, GPS, accelerometer, or other device when additional information may be utilized. The command signal may direct the WCD to display an alarm or blank the user screen. Further, in instances where the system comprises a microphone, the command signal may direct the audio device to increase or decrease a volume level, and then broadcast audio data to third parties (friends, law enforcement, security staff, or the like). One skilled in the art will thus appreciate that the functionality of the SSCP may be appropriately adapted and configured in correspondence to the nature of the system components, the users level of protection, and the level of information that any communication device is capable of.

VI. RLS Online User-Definable Surveillance Preferences

Automatically Determining Modes and Changes to Modes of Operations (security level or operational changes)
- automatically determines user activity through sensor activities, manual inputs, or both (i.e., user is in car/bus—determined by GPS travel speed of 50 mph, user is jogging—determined by accelerometer sensor movement and or algorithms and or GPS travel speed, etc.)
- Automatically determines safety level of user location or ask user first (GPS location matched with area, such as Mall parking lot, bank machine (ATM), high or potential crime area—determined by census bureau data,
- SSCP automatically determines safety level by time of day
- Automatically Communicates With Remote Interactive Server (RIS) or asks user first when
  - SSCP Sensor inputs causes alarm to be activated
  - Mode level starts Remote Surveillance Monitoring (RSM)—(alarmed or no alarm this can occur)—when a user is within a high risk area, Remote Surveillance Monitoring (RSM) may be used without alarm activation
  - Sensor determines user activity (e.g., biking, running, not moving, etc.) Remote Interactive Server (RIS) automatically communicates with user device
  - attempting to verify user status (e.g., need help, help not needed, is system working, etc.)
  - changing the SSCP mode or safely level
  - informing the user of potential risks (SSCP may vibrate (or audible sound/image) when user is in a high risk area, near a recent crime, etc.)
  - informing the user of a person or vehicle and/or image, to look for (e.g., criminal, person willing to help (police, individual nearby, security, etc.), vehicle that was stolen or involved a crime),
  - Informing the user of directions to the closest law enforcement or safe area such as an embassy, or high traffic area such as a mall, store, or other similar area.
    - Informing the user directions by SSCP vibrations for which turn to make (e.g., one long vibration informs the user to turn right and repeated short vibrations informs the user to turn left)—this allows a person walking or running away from potential danger
    - Informing the user directions by SSCP speaker phone via audible directions
  - Acknowledging surveillance and or security measures are activated
  - Instructing the user in how to help (e.g., point camera at criminal, show criminal the images sent to RSM which cannot be erased, etc.)
  - Showing screens for the criminal to view (e.g., law enforcement arriving in 2 minutes and 12 seconds, images have been sent to local law enforcement, etc.)
  - Engaging telephone or video conferencing between the SSCP and RIS and/or third party person or agency.

The invention claimed is:

1. An interactive personal security and surveillance system comprising:
   at least one computing device; and
   at least one application executable in the at least one computing device, the application comprising:
     logic that determines a user activity and/or user surroundings by matching sensor data to at least one algorithm with at least one user-defined parameter;
     logic that determines a surveillance mode that corresponds to the user activity and/or the user surroundings;
     logic that facilitates a user-defined response to the user activity and/or the user surroundings;
     logic that assigns a risk level associated with the user activity and/or the user surroundings;
     logic that accesses a remote security database to determine the user surroundings;
     logic that composes a dynamic contact list based on the user activity and/or the user surroundings;
     logic that transmits surveillance information to a publicly searchable database;
     logic that communicates the surveillance information to at least one remotely located computer device; and
     logic that remotely stores the surveillance information.

2. The system of claim 1, wherein the logic that facilitates the user-defined response further comprises logic that automatically activates the user-defined response to the user activity and/or the user surroundings.

3. The system of claim 1, further comprising logic that allows another authorized remote user to monitor the user activity and/or the user surroundings.

4. The system of claim 1, further comprising logic that provides the user an instruction according to the surveillance mode.

5. A system comprising:
   at least one computing device; and
   at least one application executable in the at least one computing device, the application comprising:
      logic that determines a user activity and/or user surroundings;
      logic that determines a surveillance mode that corresponds to the user activity and/or the user surroundings;
      logic that facilitates a user-defined response to the user activity and/or the user surroundings; and
      logic that communicates surveillance information to at least one remotely located computer device.

6. The system of claim 5, wherein the logic that facilitates the user-defined response further comprises logic that automatically activates the user-defined response to the user activity and/or the user surroundings.

7. The system of claim 5, wherein the logic that facilitates the user-defined response further comprises logic that assigns a risk level associated with the user activity and/or the user surroundings.

8. The system of claim 5, wherein the logic that communicates the surveillance information further comprises logic that transmits the surveillance information to a publicly searchable database.

9. The system of claim 5, wherein the logic that communicates the surveillance information further comprises:
   logic that composes a dynamic contact list based on the user activity and/or the user surroundings; and
   logic that notifies at least one contact from the dynamic contact list.

10. The system of claim 5, wherein the logic that determines the user activity and/or the user surroundings further comprises logic that matches sensor data to at least one algorithm with at least one user-defined parameter.

11. The system of claim 5, wherein the logic that determines the user activity and/or the user surroundings further comprises logic that accesses a remote security database.

12. The system of claim 5, further comprising logic that allows another authorized remote user to monitor the user activity and/or the user surroundings.

13. The system of claim 5, further comprising logic that provides the user an instruction according to the surveillance mode.

14. The system of claim 5, further comprising logic that encodes for display a false functioning screen according to the surveillance mode.

15. A method comprising the steps of:
   determining, by a computing device, a user activity and/or user surroundings;
   determining, by the computing device, a surveillance mode that corresponds to the user activity and/or the user surroundings;
   facilitating, by the computing device, a user-defined response to the user activity and/or the user surroundings; and
   communicating, by the computing device, surveillance information to at least one remotely located computer device.

16. The method of claim 15, wherein the step of facilitating the user-defined response further comprises the step of automatically activating, by the computing device, the user-defined response to the user activity and/or the user surroundings.

17. The method of claim 15, wherein the step of facilitating the user-defined response further comprises the step of assigning, by the computing device, a risk level associated with the user activity and/or the user surroundings.

18. The method of claim 15, wherein the step of communicating the surveillance information further comprises the step of transmitting, by the computing device, the surveillance information to a publicly searchable database.

19. The method of claim 15, wherein the step of communicating the surveillance information further comprises the steps of:
   composing, by the computing device, a dynamic contact list based on the user activity and/or the user surroundings; and
   notifying, by the computing device, at least one contact from the dynamic contact list.

20. The method of claim 15, wherein the step of determining the user activity and/or the user surroundings further comprises the step of matching, by the computing device, sensor data to at least one algorithm with at least one user-defined parameter.

* * * * *